United States Patent
Narimani et al.

(10) Patent No.: US 9,325,252 B2
(45) Date of Patent: Apr. 26, 2016

(54) MULTILEVEL CONVERTER SYSTEMS AND SINUSOIDAL PULSE WIDTH MODULATION METHODS

(71) Applicants: Mehdi Narimani, Hamilton (CA); Bin Wu, Toronto (CA); Zhongyuan Cheng, Cambridge (CA); Navid Zargari, Cambridge (CA)

(72) Inventors: Mehdi Narimani, Hamilton (CA); Bin Wu, Toronto (CA); Zhongyuan Cheng, Cambridge (CA); Navid Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 140 days.

(21) Appl. No.: 14/153,103

(22) Filed: Jan. 13, 2014

(65) Prior Publication Data
US 2015/0200602 A1    Jul. 16, 2015

(51) Int. Cl.
  *H02M 5/458*  (2006.01)
  *H02M 1/12*  (2006.01)
  *H02M 7/483*  (2007.01)
  *H02M 1/00*  (2007.01)
  *H02M 7/487*  (2007.01)

(52) U.S. Cl.
  CPC .............. *H02M 5/4585* (2013.01); *H02M 1/12* (2013.01); *H02M 7/483* (2013.01); *H02M 7/487* (2013.01); *H02M 2001/0003* (2013.01)

(58) Field of Classification Search
  CPC .................... H02M 7/483; H02M 2007/4835; H02M 7/487; H02M 7/49
  USPC .................................... 363/34–37, 65, 67–72
  See application file for complete search history.

(56) References Cited

U.S. PATENT DOCUMENTS

| | | | |
|---|---|---|---|
| 4,443,841 A | 4/1984 | Mikami et al. | |
| 4,894,621 A | 1/1990 | Koenig et al. | |
| 5,298,848 A | 3/1994 | Ueda et al. | |
| 5,361,196 A | 11/1994 | Tanamachi et al. | |
| 5,502,633 A | 3/1996 | Miyazaki et al. | |
| 5,625,545 A | 4/1997 | Hammond | |
| 5,638,263 A | 6/1997 | Opal et al. | |
| 5,642,275 A | 6/1997 | Peng et al. | |
| 5,790,396 A | 8/1998 | Miyazaki et al. | |
| 5,933,339 A | 8/1999 | Duba et al. | |

(Continued)

FOREIGN PATENT DOCUMENTS

| | | |
|---|---|---|
| CN | 1190278 | 8/1998 |
| CN | 1253999 | 5/2000 |

(Continued)

OTHER PUBLICATIONS

Ghias et al., Voltage balancing strategy for a five-level flying capacitor converter using phase disposition PWM wit sawtooth-shaped carriers, Jun. 2012, pp. 5013-5019.*

(Continued)

*Primary Examiner* — Jeffrey Gblende
(74) *Attorney, Agent, or Firm* — Fay Sharpe LLP

(57) ABSTRACT

Sinusoidal pulse width modulation (SPWM) control techniques, computer readable mediums, and apparatus are presented for operating a multilevel converter, in which a desired AC node voltage level is determined through comparison of a plurality of carrier signals or values to at least one reference signal or value, and a switching state is selected from a plurality of redundant switching states corresponding to the desired AC node voltage level for generating switching control signals based at least partially on a switched capacitor voltage balancing goal or other control objective.

20 Claims, 10 Drawing Sheets

(56) References Cited

U.S. PATENT DOCUMENTS

| | | | |
|---|---|---|---|
| 5,986,909 A | 11/1999 | Hammond et al. | |
| 6,005,788 A | 12/1999 | Lipo et al. | |
| 6,031,738 A | 2/2000 | Lipo et al. | |
| 6,058,031 A * | 5/2000 | Lyons et al. | 363/67 |
| 6,075,350 A | 6/2000 | Peng | |
| 6,101,109 A * | 8/2000 | Duba et al. | 363/71 |
| 6,166,929 A | 12/2000 | Ma et al. | |
| 6,222,284 B1 | 4/2001 | Hammond et al. | |
| 6,229,722 B1 | 5/2001 | Ichikawa et al. | |
| 6,236,580 B1 | 5/2001 | Aiello et al. | |
| 6,269,010 B1 | 7/2001 | Ma et al. | |
| 6,320,767 B1 | 11/2001 | Shimoura et al. | |
| 6,359,416 B1 | 3/2002 | Rao et al. | |
| 6,366,483 B1 | 4/2002 | Ma et al. | |
| 6,411,530 B2 | 6/2002 | Hammond et al. | |
| 6,469,916 B1 | 10/2002 | Kerkman et al. | |
| 6,477,067 B1 | 11/2002 | Kerkman et al. | |
| 6,541,933 B1 | 4/2003 | Leggate et al. | |
| 6,556,461 B1 | 4/2003 | Khersonsky et al. | |
| 6,617,821 B2 | 9/2003 | Kerkman et al. | |
| 6,636,012 B2 | 10/2003 | Royak et al. | |
| RE38,439 E | 2/2004 | Czerwinski | |
| 6,697,271 B2 | 2/2004 | Corzine | |
| 6,697,274 B2 | 2/2004 | Bernet et al. | |
| 6,703,809 B2 | 3/2004 | Royak et al. | |
| 6,720,748 B1 | 4/2004 | Seibel et al. | |
| 6,795,323 B2 | 9/2004 | Tanaka et al. | |
| 6,819,070 B2 | 11/2004 | Kerkman et al. | |
| 6,819,077 B1 | 11/2004 | Seibel et al. | |
| 6,842,354 B1 | 1/2005 | Tallam et al. | |
| 6,859,374 B2 | 2/2005 | Pollanen et al. | |
| 6,982,533 B2 | 1/2006 | Seibel et al. | |
| 7,034,501 B1 | 4/2006 | Thunes et al. | |
| 7,057,905 B2 | 6/2006 | Macmillan | |
| 7,068,526 B2 | 6/2006 | Yamanaka | |
| 7,106,025 B1 | 9/2006 | Yin et al. | |
| 7,164,254 B2 | 1/2007 | Kerkman et al. | |
| 7,170,767 B2 | 1/2007 | Bixel | |
| 7,180,270 B2 | 2/2007 | Rufer | |
| 7,215,559 B2 | 5/2007 | Nondahl et al. | |
| 7,274,576 B1 | 9/2007 | Zargari et al. | |
| 7,336,509 B2 | 2/2008 | Tallam | |
| 7,342,380 B1 | 3/2008 | Kerkman et al. | |
| 7,356,441 B2 | 4/2008 | Kerkman et al. | |
| 7,400,518 B2 | 7/2008 | Yin et al. | |
| 7,428,158 B2 | 9/2008 | Bousfield, III et al. | |
| 7,471,525 B2 | 12/2008 | Suzuki et al. | |
| 7,495,410 B2 | 2/2009 | Zargari et al. | |
| 7,495,938 B2 | 2/2009 | Wu et al. | |
| 7,511,976 B2 | 3/2009 | Zargari et al. | |
| 7,568,931 B2 | 8/2009 | Hammond | |
| 7,589,984 B2 | 9/2009 | Salomaki | |
| 7,649,281 B2 | 1/2010 | Lai et al. | |
| 7,800,254 B2 | 9/2010 | Hammond | |
| 7,830,681 B2 | 11/2010 | Abolhassani et al. | |
| 7,894,224 B2 | 2/2011 | Ulrich | |
| 7,978,488 B2 | 7/2011 | Tanaka et al. | |
| 8,008,923 B2 | 8/2011 | Hammond | |
| 8,040,101 B2 | 10/2011 | Itoh et al. | |
| 8,093,764 B2 | 1/2012 | Hammond | |
| 8,107,267 B2 | 1/2012 | Tallam et al. | |
| 8,130,501 B2 | 3/2012 | Ledezma et al. | |
| 8,138,697 B2 | 3/2012 | Palma | |
| 8,144,491 B2 | 3/2012 | Bendre et al. | |
| 8,159,840 B2 | 4/2012 | Yun | |
| 8,279,640 B2 | 10/2012 | Abolhassani et al. | |
| 8,400,793 B2 | 3/2013 | Jonsson | |
| 8,441,147 B2 | 5/2013 | Hammond | |
| 9,036,379 B2 | 5/2015 | Schroeder | |
| 2007/0211501 A1 | 9/2007 | Zargari et al. | |
| 2007/0297202 A1 | 12/2007 | Zargari et al. | |
| 2008/0079314 A1 | 4/2008 | Hammond | |
| 2008/0174182 A1 | 7/2008 | Hammond | |
| 2008/0180055 A1 | 7/2008 | Zargari et al. | |
| 2009/0073622 A1 | 3/2009 | Hammond | |
| 2009/0128083 A1 | 5/2009 | Zargari | |
| 2009/0184681 A1 | 7/2009 | Kuno | |
| 2010/0025995 A1 | 2/2010 | Lang et al. | |
| 2010/0080028 A1 | 4/2010 | Cheng et al. | |
| 2010/0091534 A1 | 4/2010 | Tadano | |
| 2010/0301975 A1 | 12/2010 | Hammond | |
| 2011/0249479 A1 | 10/2011 | Capitaneanu et al. | |
| 2012/0057380 A1 | 3/2012 | Abe | |
| 2012/0057384 A1 | 3/2012 | Jones | |
| 2012/0113698 A1 | 5/2012 | Inoue | |
| 2012/0201056 A1 | 8/2012 | Wei | |
| 2013/0121042 A1 | 5/2013 | Gan et al. | |
| 2013/0148390 A1 | 6/2013 | Na | |
| 2013/0272045 A1 | 10/2013 | Soeiro | |
| 2013/0286704 A1 * | 10/2013 | Liu et al. | 363/132 |
| 2014/0063870 A1 | 3/2014 | Bousfield, III | |
| 2014/0098587 A1 * | 4/2014 | Yatsu | 363/131 |
| 2014/0112040 A1 * | 4/2014 | White | 363/123 |
| 2014/0204632 A1 | 7/2014 | Noetzold et al. | |
| 2014/0268967 A1 * | 9/2014 | White et al. | 363/133 |
| 2014/0293667 A1 * | 10/2014 | Schroeder et al. | 363/60 |

FOREIGN PATENT DOCUMENTS

| | | |
|---|---|---|
| CN | 1414692 | 4/2003 |
| CN | 2577503 | 10/2003 |
| CN | 190885 C | 2/2005 |
| CN | 2737060 | 10/2005 |
| CN | 1925289 | 3/2007 |
| EP | 0874448 | 10/1998 |
| EP | 1641111 A2 | 3/2006 |
| EP | 1713168 A3 | 10/2006 |
| EP | 2378865 | 4/2012 |
| EP | 2568591 A1 | 3/2013 |
| EP | 2698912 A2 | 2/2014 |
| GB | 1295261 A | 11/1972 |
| JP | 2006223009 A | 8/2006 |
| JP | 2013102674 A | 5/2013 |
| KR | 20080061641 A | 7/2008 |
| TW | 439350 | 6/2001 |
| WO | WO2012105737 A1 | 8/2012 |

OTHER PUBLICATIONS

Abu-Rub, "Medium-Voltage Multilevel Converters-State of the Art, Challenges, and Requirements in Industrial Applications", IEEE Transactions on Industrial Electronics, vol. 57, N. 8, Aug. 2010, pp. 2581-2596.

Peng, "A Generalized Multilevel Inverter Topology with Self Voltage Balancing", IEE Transactions on Industry Applications, vol. 37, No. 2, Mar./Apr. 2001, pp. 611-618.

Choi et al., "A General Circuit Topology of Multilevel Inverter", Power Electronics Specialists Conference, 1991, PESC '92 Record., $22^{nd}$ Annual IEEE, Jun. 24-27, 1991, 8 pgs.

Zhang et al., "A Multilevel Converter Topology with Common Flying Capacitors", IEEE, 2013, pp. 1274-1280.

Loh et al., "Reduced Common-Mode Modulation Strategies for Cascaded Multilevel Inverters"; IEEE Transactions on Industry Applications; IEEE Service Center, Piscataway, NJ; vol. 39, No. 5; Sep. 1, 2003; pp. 1386-1395.

Zhang et al., "Multilevel Inverter Modulation Schemes to Eliminate Common-Mode Voltages"; IEEE Transactions on Industry Applications; IEEE Service Center, Piscataway, NJ; vol. 36, No. 6; Nov. 1, 2000; pp. 1645-1653.

Kim et al., "A New PWM Strategy for Common-Mode Voltage Reduction in Neutral-Point-Clamped Inverter-Fed AC Motor Drives"; IEEE Transactions on Industry Applications; IEEE Service Center, Piscataway, NJ; vol. 37, No. 6; Nov. 11, 2001; pp. 1840-1845.

Celanovic et al., "a Comprehensive Study of Neutral-Point Voltage Balancing Problem in Three-Level Neutral-Point-Clamped Voltage Source PWM Inverters"; IEEE Transactions on Power Electronics, Institute of Electrical and Electronics Engineers; vol. 15, No. 2; Feb. 1, 2000, pp. 242-249.

European Search Report, EP Appl. No. 15150396.8-1809; Mailed Jun. 22, 2015; Completed Jun. 1, 2015; The Hague; 9 pgs.

(56) References Cited

OTHER PUBLICATIONS

Ghias et al., "Performance Evaluation of a Five-Level Flying Capacitor Converter With Redcued DC Bus Capacitance Under Two Different Modulation Schemes"; Power Electronics for Distributed Generation Systems (PEDG); 2012 3$^{rd}$ IEEE Int'l Symposium, IEEE, Jun. 25, 2012; pp. 857-864.

Ghias et al., "Voltage Balancing Strategy for a Five-Level Flying Capacitor Converter Using Phase Disposition PWM With Sawtooth-Shaped Carriers";IECON 2012—38$^{th}$ Annual Conf., IEEE Industrial Electronics Society; Oct. 25, 2012; pp. 5013-5019.

Maia et al., "Associating PWM and Balancing Techniques for Performance Improvement of Flying Capacitor Inverter"; 2013 Brazilian Power Electronics Conf., IEEE; Oct. 27, 2013; pp. 92-99.

Akagi et al., "A Passive EMI Filter for Eliminating Both Bearing Current and Ground Leakage Current From an Inverter-Driven Motor", IEEE Transactions on Power Electronics, 2006 , pp. 1459-1469.

Akagi et al., "An Approach to Eliminating High-Frequency Shaft Voltage and Ground Leakage Current From an Inverter-Driven Motor", IEEE Transactions on Industry Applications, 2004 , pp. 1162-1169.

Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.

Angulo, Mauricio, et al., "Level-shifted PMW for Cascaded Multilevel Inverters with Even Power Distribution", IEEE Power Electronics Specialists Conference (PESC), pp. 2373-2378, Jun. 2007.

Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.

Barbosa et al., "Active neutral-point-clamped multilevel converters," in Proc. IEEE 36th Power Electron. Spec. Conf., Jun. 16, 2005, pp. 2296-2301.

Bruckner et al., "The active NPC converter and its loss-balancing control," IEEE Trans. Ind. Electron., vol. 52, No. 3, pp. 855-868, Jun. 2005.

Cacciato et al., "Modified space-vector-modulation technique for common mode currents reduction and full utilization of the DC bus", in Proc. IEEE APEC Conf. Rec., 2009, pp. 109-115.

Cacciato et al., "Reduction of common mode currents in PWM inverter motor drives", IEEE Trans. Ind. Appl., vol. 35, No. 2, pp. 469â€ "476, Mar./Apr. 1999.

Cavalcanti et al., "Modulation Techniques to Eliminate Leakage Currents in Transformerless Three-Phase Photovoltaic Systems", IEEE Transactions on Industrial Electronics, 2010 , pp. 1360-1368.

Cengelci, E., et al., *A New Medium Voltage PWM Inverter Topology for Adjustable Speed Drives*, IEEE, 0-7803-4943-1, 1998, pp. 1416-1423.

Cha, Han Ju et al. An Approach to Reduce Common-Mode Voltage in Matrix Converter, Jul./Aug. 2003, IEEE, vol. 39, pp. 1151-1159.

Cha, Han Ju, "Analysis and Design of Matrix Converter for Adjustable Speed Drive and Distributed Power Sources", Aug. 2004, Texas A&M Univ., Doctor of Philosophy Dissertation Paper.

Chaudhuri, Toufann, et al., *Introducing the Common Cross Connected Stage ($C^3S$) for the 5L ANPC Multilevel Inverter*, IEEE, 978-1-4244-1668-4, 2008, pp. 167-173.

Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.

De Broe, et al., "Neutral-To-Ground Voltage Minimization in a PWM-Rectifier/Inverter Configuration", Power Electronics and Variable Speed Drives, Sep. 23-25, 1996, Conference Publication No. 429, IEEE, 1996.

Erdman, Russel J. Kerkman, David W. Schlegel, and Gary L. Skibinski, "Effect of PWM Inverters on AC Motor Bearing Currents and Shaft Voltages", 1996 IEEE.

Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.

Floricau, Dan et al., *A new stacked NPC converter: 3L-topology and control*, Proceedings of the 12$^{th}$ European Conf. on Power Electronics and Applications, EPE 2007, EPE Association, 2007, 10 pgs.

Glinka, M., *Prototype of Multiphase Modular-Multilevel-Converter with 2 MW power rating and 17-level-output-voltage*, IEEE, 0-7803-8399-0, 2004, pp. 2572-2576.

Guennegues et al., "Selective harmonic elimination PWM applied to H-bridge topology in high speed applications," in Proc. Int. Conf. POWERENG, Mar. 18-20, 2009, pp. 152-156.

Guennegues, V., et al., *A Converter Topology for High Speed Motor Drive Applications*, IEEE Xplore, 2009, 8 pgs.

Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.

Hava et al., "A high-performance PWM algorithm for common-mode voltage reduction in three-phase voltage source inverters," IEEE Trans. Power Electron., vol. 26, No. 7, pp. 1998-2008, Jul. 2011.

Hiller, Mark et al., *Medium-Voltage Drives; An overview of the common converter topologies and power semiconductor devices*, IEEE Industry Applications Magazine, Mar.-Apr. 2010, pp. 22-30.

Horvath, "How isolation transformers in MV drives protect motor insulation", TM GE Automation Systems, Roanoke, VA, 2004.

Hua, Lin, "A Modulation Strategy to Reduce Common-Mode Voltage for Current-Controlled Matrix Converters", Nov. 2006, IEEE Xplore, pp. 2775-2780.

Iman-Eini, Hossein et al., "A Fault-Tolerant Control Strategy for Cascaded H-Bridge Multilevel Rectifiers", Journal of Power Electronics, vol. 1, Jan. 2010.

Kerkman, et al., "PWM Inverters and Their Influence on Motor Over-Voltage," 1997 IEEE.

Khomfoi, Surin et al., "Fault Detection and Reconfiguration Technique for Cascaded H-bridge 11-level Inverter Drives Operating under Faulty Condition", 2007 IEEE, PEDS 2007, pp. 1035-1042.

Kieferndorf et al., "A new medium voltage drive system based on anpc-5I technology," in Proc. IEEE-ICIT, Viña del Mar, Chile, Mar. 2010,pp. 605-611.

Kouro et al., "Recent advances and industrial applications of multilevel converters," IEEE Trans. Ind. Electron., vol. 57, No. 8, pp. 2553-2580, Aug. 2010.

Kouro, Samir, et al., *Recent Advances and Industrial Applications of Multilevel Converters*, IEEE Transactions on Industrial Electronics, vol. 57, No. 8, Aug. 2010, pp. 2553-2580.

Lai et al., "Optimal common-mode voltage reduction PWM technique for inverter control with consideration of the dead-time effects-part I: basic development," IEEE Trans. Ind. Appl., vol. 40, No. 6, pp. 1605-1612, Nov./Dec. 2004.

Lai et al., "Optimal Common-Mode Voltage Reduction PWM Technique for Inverter Control with Consideration of the Dead-Time Effects—Part 1: Basic Development", 2004 IEEE.

Lee, Hyeoun-Dong et al., "A Common Mode Voltage Reduction in Boost Rectifier/Inverter System by Shifting Active Voltage Vector in a Control Period", IEEE Transactions on Power Electronics, vol. 15, No. 6, Nov. 2000.

Lesnicar et al., "An Innovative Modular Multilevel Converter Topology Suitable for a Wide Power Range", 2003 IEEE Bologna PowerTech Conference, Jun. 23-26, Bologna Italy, 6 pgs.

Lesnicar, A., et al., *A new modular voltage source inverter topology*, Inst. of Power Electronics and Control, Muenchen, DE, Oct. 10, 2007, pp. 1-10.

Lezana, Pablo et al., "Survey on Fault Operation on Multilevel Inverters", IEEE Transactions on Industrial Electronics, vol. 57, No. 7, Jul. 2010, pp. 2207-2217.

Li, Jun, et al., *A New Nine-Level Active NPC (ANPC) Converter for Grid Connection of Large Wind Turboines for Distributed Generation*, IEEE Transactions on Power Electronics, vol. 26, No. 3, Mar. 2011, pp. 961-972.

McGrath, Brendan Peter et al., "Multicarrier PMW Strategies for Multilevel Inverters," IEEE Transactions on Industrial Electronics, vol. 49, No. 4, pp. 858-867, Aug. 2002.

(56) References Cited

OTHER PUBLICATIONS

Meili et al., "Optimized pulse patterns for the 5-level ANPC converter for high speed high power applications," in Proc. 32nd IEEE IECON, Nov. 6-10, 2006, pp. 2587-2592.

Muetze & A. Binder, "Don't lose Your Bearings, Mitigation techniques for bearing currents in inverter-supplied drive systems", 2006 IEEE.

Naik et al., "Circuit model for shaft voltage prediction in induction motors fed by PWMbased AC drives", IEEE Trans. Ind. Appl., vol. 39, No. 5, pp. 1294-1299, Nov./Dec. 1996.

O-Harvest, product information, Beijing Leader & Harvest Electric Technologies Co., Ltd., http:/www.ld-harvest.com/en/3-1-2.htm, retrieved from the Internet Apr. 11, 2013, 3 pgs.

Park, Young-Min, "A Simple and Reliable PWM Synchronization & Phase-Shift Method for Cascaded H-Bridge Multilevel Inverters based on a Standard Serial Communication Protocol", IEEE 41$^{st}$ IAS Annual Meeting, pp. 988-994, Oct. 2006.

Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.

Rendusara, et al., "Analysis of common mode voltage—'neutral shift' in medium voltage PWM adjustable speed drive (MV-ASD) systems", IEEE Trans. Power Electron., vol. 15, No. 6, pp. 1124-1133, Nov. 2000.

Robicon Perfect Harmony, "Medium-Voltage Liquid-Cooled Drives", Siemens, Catalog D 15.1, 2012 USA Edition, obtained from the World Wide Web Apr. 2013, 91 pgs. (Downloaded to EFS Web as Part 1, pp. 1-49; and Part 2, pp. 50-91.

Robicon Perfect Harmony, "The Drive of Choice for Highest Demands", Siemens, Copyright Siemens AG 2008, 16 pgs, .obtained from the World Wide Web Apr. 2013.

Robicon, "Perfect Harmony MV Drive Product Overview", 18 pgs.. obtained from the World Wide Web Apr. 2013.

Rodriguez et al., "A New Modulation Method to Reduce Common-Mode Voltages in Multilevel Inverters", IEEE Transactions on Industrial Electronics, vol. 51, No. 4, Aug. 2004, 834-939.

Rodriguez et al., "Multilevel inverters: A survey of topologies, controls, and applications," IEEE Trans. Ind. Electron., vol. 49, No. 4, pp. 724-738, Aug. 2002.

Rodriguez et al., "Operation of a Medium-Voltage Drive Under Faulty Conditions", IEEE Transactions on Industrial Electronics, vol. 52, No. 4, Aug. 2005, pp. 1080-1085.

Rodriguez, et al., "Multilevel voltage source—converter topologies for industrial medium-voltage drives," IEEE Trans. Ind. Electron., vol. 54, No. 6, pp. 2930-2945, Dec. 2007.

Saeedifard, et al., "Operation and control of a hybrid seven-level converter," IEEE Trans. Power Electron., vol. 27, No. 2, pp. 652-660, Feb. 2012.

Saeedifard, Maryann et al., *Analysis and Control of DC-Capacitor-Voltage-Drift Phenomenon of a Passive Front-End Five-Level Converter*, IEEE Transactions on Industrial Electronics, vol. 54, No. 6, Dec. 2007, pp. 3255-3266.

Sedghi, S. et al., "A New Multilevel Carrier Based Pulse Width Modulation Method for Modular Multilevel Inverter", IEEE, 8$^{th}$ International Conference on Power Electronics—ECCE Asia (ICPE & ECCE), pp. 1432-1439, May 30-Jun. 3, 2011.

Sepahvand, Hossein et al., "Fault Recovery Strategy for Hybrid Cascaded H-Bridge Multi-Level Inverters", 2011 IEEE, pp. 1629-1633.

Serpa et al., "Fivelevel virtual-flux direct power control for the active neutral-point clamped multilevel inverter," in Proc. IEEE Power Electron. Spec. Conf.

Serpa, L.A. et al., *Five-Level Virtual-Flux Direct Power Control for the Active Neutral-Point Clamped Multilevel Inverter*, IEEE, 978-1-4244-1668-4, 2008, pp. 1668-1674.

Silva, Cesar et al., *Control of an Hybrid Multilevel Inverter for Current Waveform Improvement*, IEEE, 978-1-4244-1666-0, 2008, pp. 2329-2335.

Song, Wenchao et al., "Control Strategy for Fault-Tolerant Cascaded Multilevel Converter based STATCOM", 2007 IEEE, pp. 1073-1076.

Ulrich, James A., et al., *Floating Capacitor Voltage Regulation in Diode Clamped Hybrid Multilevel Converters*, IEEE, 978-1-4244-3439-8, 2009, pp. 197-202.

Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.

Un et al., "A Near State PWM Method With Reduced Switching Frequency and Reduced Common Mode Voltage for Three-Phase Voltage Source Inverters", 2007 IEEE.

Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.

Wei, Sanmin et al., "Control Method for Cascaded H-Bridge Multilevel Inverter with Faulty Power Cells", 2003 IEEE, pp. 261-267.

Wen, Jun et al., *Synthesis of Multilevel Converters Based on Single- and/or Three-Phase Converter Building Blocks*, IEEE Transactions on Power Electronics, vol. 23, No. 3, May 2008, pp. 1247-1256.

Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.

Wu, Bin, "EE8407 Power Converter Systems", Topic 6, Multilevel Cascaded H-Bridge (CHB) Inverters, pp. 1-14, 2006.

Wu, Bin, "High-Power Converters and AC Drives", Wiley-IEEE Press, 2006, Chapter 7, pp. 119-142.

Wu, Bin, "High-Power Converters and AC Drives", Wiley-IEEE Press, 2006, Chapter 9, pp. 179-186.

Wu, High-Power Converters and AC Drives. New York/Piscataway, NJ: Wiley/IEEE Press, 2006, Ch. 1.

Yantra Harvest Energy Pvt. Ltd., "Medium Voltage Drives", www.yantraharvest.com, obtained from the World Wide Web Apr. 2013.

Yin, et al., "Analytical Investigation of the Switching Frequency Harmonic Characteristic for Common Mode Reduction Modulator", 2005 IEEE.

Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012, pp. 1152-1158.

Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.

Zhu et al., An Integrated AC Choke Design for Common-Mode Current Suppression in Neutral-Connected Power Converter Systems. IEEE Transactions on Power Electronics, 2012, pp. 1228-1236.

\* cited by examiner

| | S1 | S2 | S3 | S4 | S5 | S6 | S7 | S8 | IMPACT ON $V_{C1}$ | IMPACT ON $V_{C2}$ | IMPACT ON $V_{C3}$ | L |
|---|---|---|---|---|---|---|---|---|---|---|---|---|
| V1 | 1 | 1 | 1 | 1 | 0 | 0 | 0 | 0 | N/A | N/A | N/A | 4 |
| V2 | 1 | 1 | 0 | 1 | 1 | 0 | 0 | 0 | CHARGE $I_{OUT} > 0$ DISCHARGE $I_{OUT} < 0$ | N/A | N/A | 3 |
| V3 | 0 | 1 | 1 | 1 | 0 | 0 | 0 | 1 | N/A | N/A | DISCHARGE $I_{OUT} > 0$ CHARGE $I_{OUT} < 0$ | 3 |
| V4 | 1 | 0 | 1 | 1 | 0 | 0 | 1 | 0 | DISCHARGE $I_{OUT} > 0$ CHARGE $I_{OUT} < 0$ | DISCHARGE $I_{OUT} > 0$ CHARGE $I_{OUT} < 0$ | CHARGE $I_{OUT} > 0$ DISCHARGE $I_{OUT} < 0$ | 3 |
| V5 | 1 | 1 | 0 | 0 | 1 | 1 | 0 | 0 | CHARGE $I_{OUT} > 0$ DISCHARGE $I_{OUT} < 0$ | CHARGE $I_{OUT} > 0$ DISCHARGE $I_{OUT} < 0$ | N/A | 2 |
| V6 | 1 | 0 | 0 | 1 | 1 | 0 | 1 | 0 | N/A | DISCHARGE $I_{OUT} > 0$ CHARGE $I_{OUT} < 0$ | CHARGE $I_{OUT} > 0$ DISCHARGE $I_{OUT} < 0$ | 2 |
| V7 | 0 | 1 | 0 | 1 | 1 | 0 | 0 | 1 | CHARGE $I_{OUT} > 0$ DISCHARGE $I_{OUT} < 0$ | N/A | DISCHARGE $I_{OUT} > 0$ CHARGE $I_{OUT} < 0$ | 2 |
| V8 | 0 | 0 | 1 | 1 | 0 | 0 | 1 | 1 | DISCHARGE $I_{OUT} > 0$ CHARGE $I_{OUT} < 0$ | DISCHARGE $I_{OUT} > 0$ CHARGE $I_{OUT} < 0$ | N/A | 2 |
| V9 | 0 | 0 | 0 | 0 | 1 | 1 | 1 | 1 | N/A | DISCHARGE $I_{OUT} > 0$ CHARGE $I_{OUT} < 0$ | N/A | 1 |
| V10 | 1 | 1 | 0 | 0 | 1 | 1 | 1 | 0 | CHARGE $I_{OUT} > 0$ DISCHARGE $I_{OUT} < 0$ | N/A | CHARGE $I_{OUT} > 0$ DISCHARGE $I_{OUT} < 0$ | 1 |
| V11 | 0 | 0 | 0 | 0 | 1 | 1 | 0 | 1 | N/A | CHARGE $I_{OUT} > 0$ DISCHARGE $I_{OUT} < 0$ | DISCHARGE $I_{OUT} > 0$ CHARGE $I_{OUT} < 0$ | 1 |
| V12 | 0 | 0 | 0 | 0 | 1 | 1 | 1 | 1 | N/A | N/A | N/A | 0 |

FIG. 8

MULTILEVEL CONVERTER SYSTEMS AND SINUSOIDAL PULSE WIDTH MODULATION METHODS

BACKGROUND

Multilevel converters can be used for rectifying AC to produce DC, and may also be employed to generate AC output voltages for use in motor drives or other power conversion systems. This modular form of converter finds particular use in situations where relatively large output voltages are required. Multilevel voltage source converter architectures include flying or switched capacitor designs (FC), neutral point clamped (NPC) designs, modular multilevel converter (MMC), as well as cascaded and hybrid typologies such as and the cascaded H-bridge (CHB) designs. NPC designs include a pair of capacitors connected across a DC input providing a neutral node, with each capacitor being charged to half the DC input value, and a series of switches are connected across the DC bus, with a pair of diodes connecting intermediate switch nodes to the neutral point. Multilevel converters offer certain advantages for medium-voltage high-power conversion applications; such as motor drives, microgrids and distributed generation systems. The main features of these topologies, as compared with the two-level voltage source converters (VSC), are the capability to reduce harmonic distortion of the AC-side waveforms, to reduce dv/dt switching stresses, to reduce switching losses, and to minimize or even eliminate the need for an interface transformer. Certain variant and hybrid configurations have been proposed, including five-level H-bridge NPC (5L-HNPC), three-level active NPC (3L-ANPC), and five-level active NPC (5L-ANPC). Although these hybrid topologies mitigate some drawbacks of the classical multilevel topologies, certain shortcomings remain. For example, a 5L-ANPC is a combination of a 3L-ANPC and 3L-FC, which increases the number of levels to reach higher output levels. However, in addition to complexity of the system due to the need to control flying capacitor voltages to facilitate use of the same rating switch for all the switches, two devices are connected in series for the top and bottom switches since the voltage stresses of the switches for a 5L-ANPC are different, with the outer switch ratings being half of the dc-link voltage while the inner devices see only one third of the dc-link voltage.

Nested neutral point clamped (NNPC) multilevel designs address these shortcomings, such as a four-level NNPC converter, which can operate for a wide voltage range (e.g., 2.4-7.2 Kv) with all the switches experiencing the same or similar voltage stress levels without requiring series-connection of multiple switches. Moreover, NNPC architectures generally have fewer components than conventional multilevel converters and may mitigate the need for complex transformers. Certain of these advantages, moreover, are facilitated by controlling the flying capacitor voltages, thereby controlling the switching device voltages levels. However, implementing switched capacitor voltage control or other control objectives using space vector modulation (SVM) requires many calculations in each switching period, and thus increases the control system complexity and computational delays can deteriorate the performance of the control system. Accordingly, a need remains for simple, yet robust, control techniques and apparatus for operating NNPC and other multilevel converter architectures without the computational complexities of space vector modulation techniques.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

The present disclosure provides sinusoidal pulse width modulation (SPWM) techniques by which the complexity of space vector modulation techniques is mitigated or avoided and the benefits of NNPC and other multilevel converter configurations is achieved via simple sinusoidal PWM (SPWM) control which can be applied to each phase of a multi-phase multilevel converter. The inventors have appreciated that different PWM techniques can be used such as space vector modulation to control and balance the flying capacitor voltages of an NNPC or other multilevel or switched capacitor converter by using switching redundancy to produce the output levels and at the same time regulate the flying capacitor voltages. However, the inventors have appreciated that SVM-based approaches require many calculations which increase the complexity of control system implementation, particularly at low modulation index operation where there are large numbers of redundant switching states. The SPWM techniques of the present disclosure can be advantageously employed to reduce the complexity of the implementation for the control system and thus improve the performance of the whole system while maintaining the benefits of NNPC and other multilevel converters for single phase or multiphase power conversion systems.

A power conversion system and control apparatus are provided according to various aspects of the disclosure in which a multilevel converter is operable according to control signals to provide multiple distinct voltage levels at an AC node, with a controller configured to compare a plurality of carrier signals or values to at least one reference signal or value in hardware and/or firmware/software to determine a desired AC node voltage level for operation of the multilevel converter. The controller selectively chooses from a plurality of redundant switching states for at least one of the distinct voltage levels based at least partially on a control objective, such as regulating or balancing switched capacitor voltages of the converter. In certain embodiments, the controller selects from redundant states at least partially according to the desired AC node voltage level, the present voltage conditions of the switched capacitors, and the polarity of current flowing into or out of the AC node to facilitate capacitor voltage regulation. In various embodiments, one or more control objectives can be facilitated by the redundant switching state selection, including without limitation switched capacitor voltage balancing or regulation, common mode reduction, power factor correction, regulation of a DC bus voltage, noise reduction or control, etc.

The use of SPWM and selective redundant state selection may be advantageously employed to avoid the complexity and computational intensity associated with space vector modulation approaches while still implementing one or more control objectives and providing the advantages of multilevel converters. In certain embodiments, moreover, the multilevel converter is a nested neutral point clamped (NNPC) converter operable to provide four or more distinct voltage levels at an AC node, and various embodiments can include multiple converters forming a multiphase system. In addition, the converter can be employed as a rectifier or as an inverter in various embodiments. In certain embodiments, the power conversion system includes first and second multilevel converters forming a back-to-back rectifier/inverter combination with an intervening DC bus circuit, with a controller comparing carrier signals or values with references to provide switching controls to the multilevel rectifier and inverter stages, with selection from a plurality of redundant switching states to facilitate one or more control objectives. In further embodiments, moreover, the multilevel converter is an NNPC H-bridge structure including two multilevel NNPC converter stages.

Methods are provided according to further aspects of the present disclosure, for operating a multilevel converter. The methods include determining a desired AC node voltage level by comparing carrier signals or values to at least one reference signal or value, as well as selectively choosing from a plurality of redundant switching states corresponding to the desired AC node voltage level based at least partially on a control objective, and providing the switching control signals to the converter circuit. The control objective in certain embodiments relates to switched capacitor voltage regulation, with the redundant switching state choice being made at least partially according to the desired AC node voltage level, the present switched capacitor voltages and the polarity of current flowing at the AC node of the converter. The methods may be employed in multilevel inverters to convert DC input power and provide AC output power at the AC node at least partially according to the desired AC node voltage level and the control objective via the switching control signals. In rectifier implementations, the controller provides the switching control signals to convert AC input power received via the AC node to provide DC output power at the DC nodes and to cause the multilevel converter to control a voltage level at the AC node at least partially according to the desired AC node voltage level and the control objective. In accordance with further aspects of the present disclosure, non-transitory computer readable mediums are provided with computer executable instructions for performing the methods.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 8 is a table showing an exemplary set of switching states for the five level NNPC power converter of FIG. 7;

DETAILED DESCRIPTION

Figure 1:
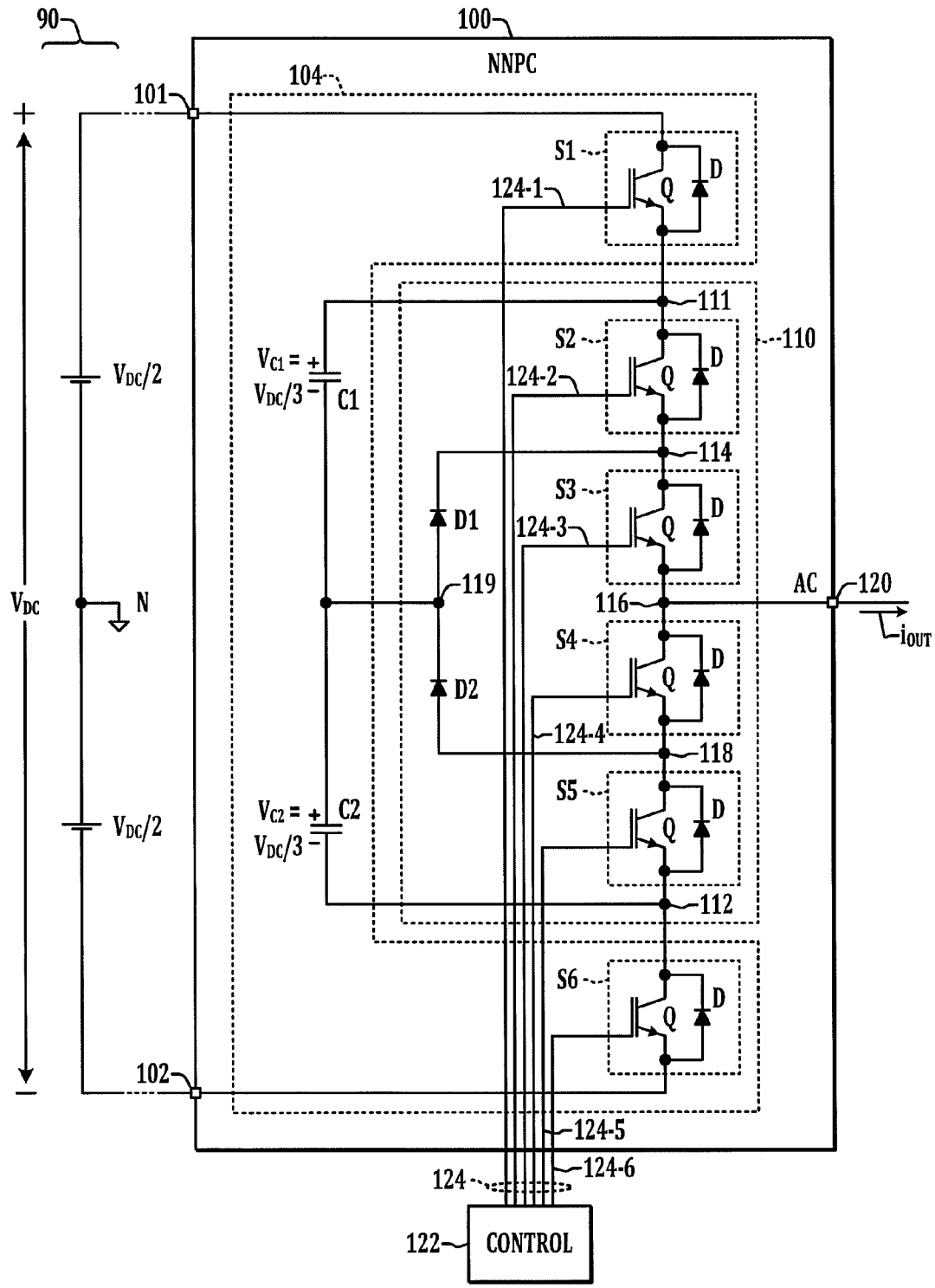
FIG. 1 is a schematic diagram illustrating an exemplary nested neutral point clamped (NNPC) multilevel power converter including an inverter circuit and a switched capacitor circuit with a controller using redundant switch state selection to control charging and discharging of first and second flying capacitors to provide multilevel AC node voltage while facilitating one or more control objectives and to regulate the flying capacitor voltages in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale.

Sinusoidal pulse width modulation (SPWM) operating processes and power converter apparatus are disclosed hereinafter in the context of nested neutral point clamped (NNPC) multilevel converter stages 100. Various aspects and concepts of the present disclosure may be employed in other forms and types of multilevel converter stages amenable to SPWM operation, including without limitation switched capacitor multilevel converters, cascaded multilevel converters such as cascaded H Bridges (CHBs), neutral point clamped (NPC) multilevel converter stages, modular multilevel converter (MMC), NNPC stages, and the like.

FIG. 1 illustrates an exemplary multilevel converter stage 100 in which various aspects of the present disclosure may be implemented. The illustrated converter 100 is a nested neutral point clamped (NNPC) configuration, which combines a switched or flying capacitor (FC) topology with neutral point clamped (NPC) topology to implement four-level voltage operation atom AC node 116, whether operating as a rectifier or as an inverter. In this embodiment, moreover, in order to ensure equally spaced steps in the output voltages, the voltages across the switched capacitors C1 and C2 of the converter stage 100 are regulated to one third of the total DC-link voltage, although not a strict requirement of all embodiments of the present disclosure. The NNPC converter 100 advantageously employs fewer components than conventional four-level topologies and is of lower complexity. Moreover, the number of diodes and capacitors in the converter stage 100 is much less than that of conventional four-level NPC designs. Although illustrated in FIG. 1 in the form of a four-level converter 100, the various concepts of present disclosure find utility in association with multilevel converter stages providing any integer number N discrete AC voltage levels, where N≥4. Four output levels are achieved in the converter 100 from six distinct switching combinations shown in table 126 of FIG. 2, as described further below, where the NNPC converter switching devices S1-S6 are rated to $V_{DC}/3$.

The exemplary four-level NNPC converter stage 100 of FIG. 1 can be combined with other such stages 100 to form a multiphase multi-level power conversion system (e.g., FIG. 3 below) and the described NNPC power converters 100 or other multilevel converters having switched or flying capacitors may be used to form single or multiphase power supplies for driving any type of load, for example as motor drives, although various concepts of the present disclosure are not limited to any specific applications, and can be employed in any form of power conversion system driving any type of load. Moreover, the multilevel converter stages 100 can be used to form an inverter for DC-AC conversion, such as an output stage of a motor drive, and/or the stage(s) 100 may be used to form a multilevel rectifier circuit to convert received single or multiphase AC input power to provide DC output power. As seen in FIG. 1, the converter stage 100 has first and second DC terminals 101 and 102, respectively, which are inputs in the case of an inverter application, as well as an AC terminal 120 which provides a single-phase AC output voltage and associated output current $i_{OUT}$ to drive a load (not shown) in the case of an inverter application.

The NNPC multilevel converter 100 of FIG. 1 includes a switched capacitor (e.g., flying capacitor) circuit 104 nesting an NPC type inverter circuit 110. Examples of NNPC multilevel converters and systems using NNPC converter stages are shown and described in U.S. patent application Ser. No. 13/922,401, filed Jun. 20, 2013, entitled MULTILEVEL VOLTAGE SOURCE CONVERTERS AND SYSTEMS and assigned to the assignee of the present application, the entirety of which is hereby incorporated by reference. Although referred to herein as an NNPC power converter, the center node 119 of the NPC type inverter circuit 110 need not be connected to any system "neutral". The converter 100 receives DC input electrical power from a source 90 via the DC terminals 101 and 102, where FIG. 1 illustrates an exemplary input configuration including two series-connected batteries, each having a voltage value of $V_{DC}/2$ with the power converter 100 thus being provided with a DC input voltage having a value $V_{DC}$. In addition, although not a strict requirement of all implementations of the power converter 100, the configuration shown in FIG. 1 includes a neutral node "N" connected to the connection point of the two batteries of the DC input source 90. Any suitable DC source 90 can be used in connection with the power converter 100 when employed as an inverter stage, including without limitation one or more batteries, active and/or passive rectifiers, etc. Moreover, the DC source 90 may include DC bus capacitances, whether a single capacitor or any combination of multiple capacitors connected in any series and/or parallel configuration. In addition, certain embodiments of the NNPC converter stage 100 may include one or more on-board capacitances connected between the DC input terminals 101 and 102.

The converter stage 100 includes an inverter (or converter) circuit 110 with a first switching circuit providing switching devices S2-S5 connected in series with one another between first and second inverter circuit input nodes 111 and 112, as well as an inverter output or "AC" node 116 connecting two of the inverter switching devices S3 and S4, where the inverter output node 116 is connected directly or indirectly to the AC output terminal 120 of the converter 100 in the example of FIG. 1. The inverter circuit 110, moreover, can include any integer number of switching devices S connected in series with one another between the nodes 111 and 112. In the illustrated example, four devices S2-S5 are provided, with the AC node 116 having two switching devices S2 and S3 between the AC node 116 and the upper input node 111, and two switches S4 and S5 connected between the output node 116 and the second inverter input node 112. In addition, the switched capacitor circuit 104 includes additional switches S1 and S6 connected as shown between the inverter inputs 111 and 112 and the corresponding DC input terminals 101 and 102. Any suitable type of switching devices S1-S6 may be used in the circuits 104 and 110 of the power stage 100, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc. Moreover, as illustrated in FIG. 1, the individual switches S1-S6 include anti-parallel diodes for conducting current in reverse directions when the switch is off, although not a strict requirement of all embodiments.

The inverter circuit 110 also includes a clamping circuit having first and second clamping elements, such as diodes D1 and D2 connected in series with one another, with the cathode of D1 connected to a first internal node 114, and the anode of D2 connected to a second internal node 118. The cathode of D2 is joined to the anode of D1 at a third internal node 119. The diode D1 provides a conductive path from the third internal node 119 to the first internal node 114, and D2 provides a conductive path from the second internal node 118 to the third internal node 119. Active clamping switches or other clamping elements can be used in other embodiments instead of clamping diodes as shown in the drawings. Other configurations are possible in which diodes or other clamping elements are connected in series with one another between first and second internal nodes of the inverter switching circuit. Further, single diodes D1 and D2 may be used as shown, or multiple diodes or other clamping elements may be used. For example, D1 can be replaced with two or more diodes in any suitable series and/or parallel configuration between the nodes 119 and 114, and D2 may be replaced with two or more diodes interconnected in any suitable fashion between the nodes 118 and 119. Furthermore, the diodes D1 and D2 and/or the clamping diodes across the switching devices S1-S6 of the NNPC converters 100 can alternatively be clamping switches (not shown). The clamping diodes D1 and D2 can also be replaced by active switches to achieve active neutral point clamping.

The switched capacitor circuit 104 includes switches S1 and S6 connected between the respective DC input terminals 101 and 102 and a corresponding one of the inverter input nodes 111 and 112. In addition, the switched capacitor circuit 104 includes first and second capacitors C1 and C2 individually connected between the third internal node 119 and the corresponding inverter circuit input nodes 111 and 112 with a center node joining the capacitors C1 and C2 being connected to the node 119 as shown. Any suitable type and configuration of capacitors C1 and C2 can be used, where the individual capacitors C1 and C2 can be a single capacitor or multiple capacitors connected in any suitable series and/or parallel configuration to provide a first capacitance C1 between the nodes 111 and 119 as well as a second capacitance C2 between the nodes 119 and 112. Moreover, the switched or flying capacitors C1 and C2 are preferably of substantially equal capacitance values, although not a strict requirement of the present disclosure.

Referring also to FIGS. 2-5, a controller 122 provides switching control signals 124-2, 124-3, 124-4 and 124-5 to the respective inverter switching devices S2-S5 and provides switching control signals 124-1 and 124-6 to the switched capacitor circuit switching devices S1 and S6 to generate one of four possible distinct output voltage levels at the AC node 116, for example as an AC output voltage when the converter 100 is operated as an inverter. Similarly, when operated as a rectifier, the controller 122 provides the switching control signals 124 to provide one of four possible distinct voltage levels at the AC node 116, thereby facilitating rectifier operation to perform various control functions such as regulation of an output DC bus voltage, power factor correction, etc., where typical installations include an inductance connected between a grid or supply voltage and the AC node 116, whereby operation of the converter 100 to control the voltage at the AC node 116 to one of four possible distinct voltage levels implements a multilevel conversion. In other embodiments where the clamping devices D1 and D2 are active devices, the controller 122 may also provide switching control signals to active such active clamping devices D1 and D2.

As described further below, the present disclosure provides modulation techniques which may be implemented in the controller 122 based on sinusoidal pulse width modulation (SPWM), for example using three level-shifted triangular carriers (FIG. 6 below), all having the same frequency and the same amplitude. In-phase disposition (IPD) or other sign-triangle modulation techniques can be used, wherein the illustrated IPD example provides all carriers in phase, as further illustrated in FIG. 6 below. In operation, the controller 122 compares carriers and one or more modulation or reference signals, thereby determining the desired AC level to be provided at the AC node 116. Based on the desired level at the AC node 116 (whether for operation as a rectifier or as an inverter), the corresponding switching can be applied to the power switches S1-S6 via the generated control signals 124-1 through 124-6, as shown in the table 126 and FIG. 2.

As further shown in the table 126, moreover, there are redundant states for two middle levels (level 1 and 2). The inventors have appreciated that selective use of certain redundant states in consideration of the current flowing at the AC node 116 can charge or discharge the flying capacitors as required to implement a capacitor voltage balancing or voltage regulation control objective. In addition, selection from among redundant switching states can be employed to facilitate or implement one or more further control objectives, such as control or reduction of common mode voltages in a power conversion system, and/or power factor control for rectifier converter operation, control or regulation of a DC bus output voltage for rectifier converters 100, etc. Therefore, the controller 122 advantageously operates to determine the desired AC node voltage level by comparing carriers and one or more modulation or reference signals, determines the present capacitor voltages for C1 and C2 and determines the direction of the current flowing into or out of the AC node 116, and based on this determines (if there are redundant switching states for the desired AC node voltage level) which of the redundant switching states to select in order to implement regulation of the switched capacitor voltages across C1 and C2 for each control cycle of the converter stage 100.

The controller 122 thus capitalizes on redundancy in switching states to produce the desired AC node voltage level, and at the same time controls the voltages of the flying capacitors C1 and C2. As can be seen in the table 126 of FIG. 2, for the medium voltage levels $V_{DC}/6$ and $-V_{DC}/6$, there are two redundant switching states in the illustrated four level converter 100. Each redundant state provides a specific charging and discharging current path for each floating capacitor C1 and C2. Similar redundant states are available for higher level converters, such as the five-level converter illustrated and described in connection with FIGS. 7 and 8 below. In certain embodiments, the controller utilizes the ability to select from the redundant switching states for charging or discharging of the capacitors C1 and C2 so as to minimize the difference between the nominal reference voltage values (e.g., $V_{ref}=V_{DC}/3$ in one example) and the measured capacitor voltage values $V_{C1}$, $V_{C2}$.

The controller 122 in certain embodiments may also receive feedback signals such as voltages and/or currents which are not shown in the figures, including without limitation measured, sensed, or inferred signals or values indicating the polarity and amplitude of the current flowing into or out of the AC node 116, the voltages $V_{C1}$ and $V_{C2}$ across the capacitors C1 and C2, etc. The controller 122 can be implemented as part of the converter 100 and/or may be a separate component or system, and a single controller 122 may provide signals 124 to multiple converter stages 100 to implement the SPWM techniques to facilitate achievement of one or more control objectives as described further below. The converter controller 122 can be implemented using any suitable hardware, processor executed software or firmware, programmable logic or combinations thereof, wherein an exemplary embodiment of the controller 122 includes one or more processing elements such as microprocessors, microcontrollers, FPGAs, DSPs, programmable logic, etc., along with electronic memory, program memory and signal conditioning driver circuitry, with the processing element(s) programmed or otherwise configured to generate the inverter switching control signals 124 suitable for operating the switching devices of the power stages 100, as well as to perform other operational tasks to drive a load. Moreover, computer readable mediums are contemplated with computer executable instructions for implementing the described power converter switching control processes and techniques, which may be stored as program instructions in an electronic memory forming a part of, or otherwise operatively associated with, the controller 122.

Figure 2:
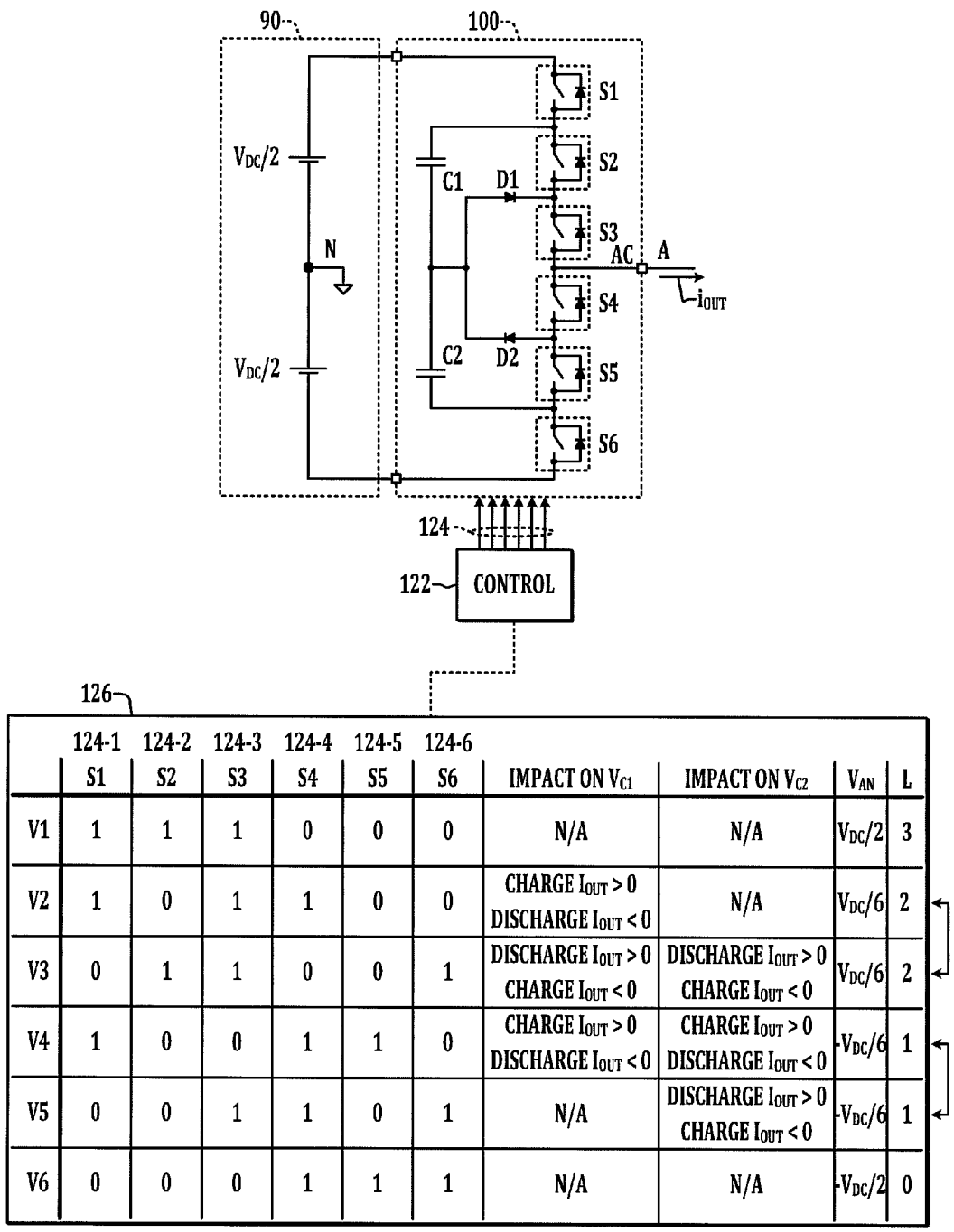
FIG. 2 is a partial schematic diagram illustrating an exemplary set of switching states for the NNPC power converter of FIG. 1 to provide a four-level AC node voltage with substantially equally spaced steps.
Figure 3:
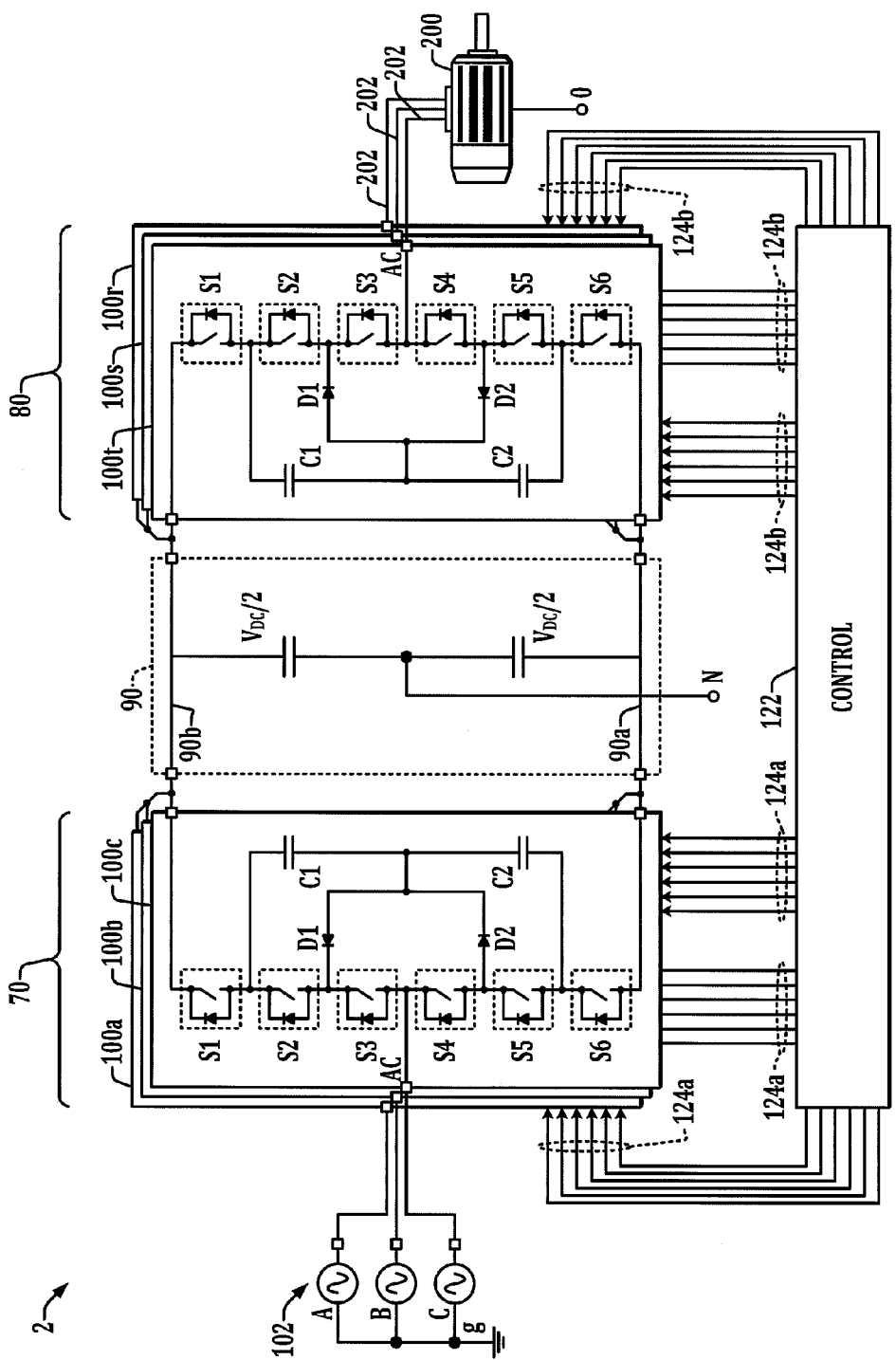
FIG. 3 is a schematic diagram illustrating three NNPC power converters and associated NNPC rectifier DC supplies for providing a three-phase voltage output to drive a motor load.
Figure 4:
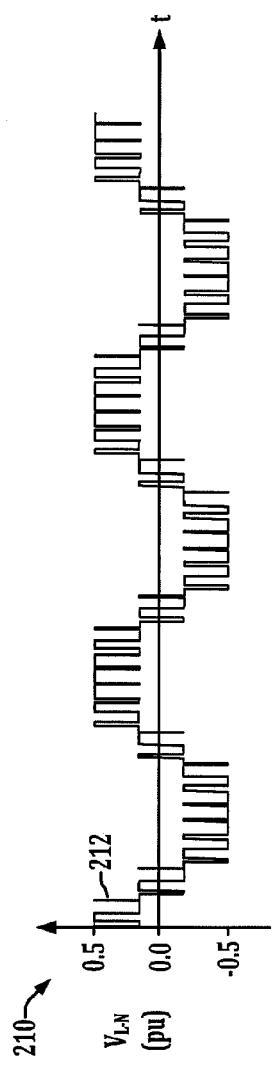
FIG. 4 is a graph showing a four-level line-to-neutral voltage output waveform for the NNPC power converter of FIGS. 1 and 2.
Figure 5:
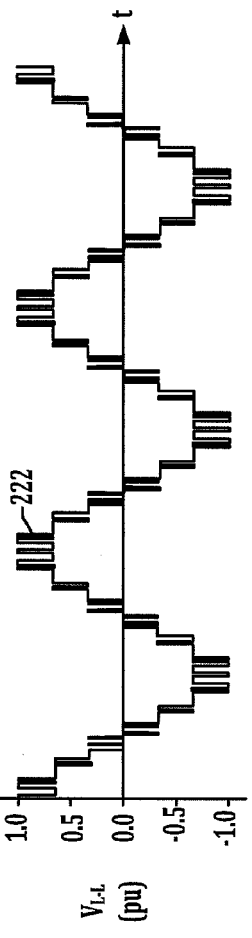
FIG. 5 is a graph illustrating a seven-level line-to-line voltage output waveform for the three-phase motor drive implementation of FIG. 3.

As best seen in FIG. 2, the controller 122 provides the switching control signals 124 to the switches S1-S6 in pulse width modulated (PWM) form so as to provide a multilevel output voltage (e.g., line-to-neutral voltage $V_{AN}$) at the AC (e.g., inverter output) node 116. In the illustrated embodiment, for instance, the controller 122 provides the switching control signals 124 to the switches S1-S6 to provide the output voltage $V_{AN}$ at one of four distinct line-to-neutral voltage levels. A graph 210 in FIG. 4 illustrates an exemplary four-level line-to-neutral voltage waveform 212 ($V_{AN}$) at the inverter output node 116 relative to the neutral node "N". In FIG. 3, three NNPC stages 100a, 100b and 100c are connected to corresponding phases A, B and C of a three phase power source 102 to form a three phase rectifier circuit 70 providing DC voltage in a DC bus circuit 90 including two DC bus capacitances of equal value, with a connecting node providing a system neutral N. As seen in FIG. 3, moreover, three different NNPC converter stages 100r, 100s and 100t may be connected to the positive and negative lines 90a and 90b of the DC bus circuit 90 to form a three phase multilevel inverter 80 providing AC output voltages to motor phase lines 202 to drive a three-phase motor load 200, with the controller 122 providing a set of inverter switching control signals 124b to each of the NNPC stages 100r-100t. FIG. 5 illustrates a graph 220 showing an exemplary line-to-line voltage waveform 222 in the system of FIG. 3, in which the controlled switching of the three NNPC inverter stages 100r, 100s and 100*t* at relative phase angles of 120° provides a seven-level line-to-line voltage waveform 222 for driving the motor load 200.

Figure 6:
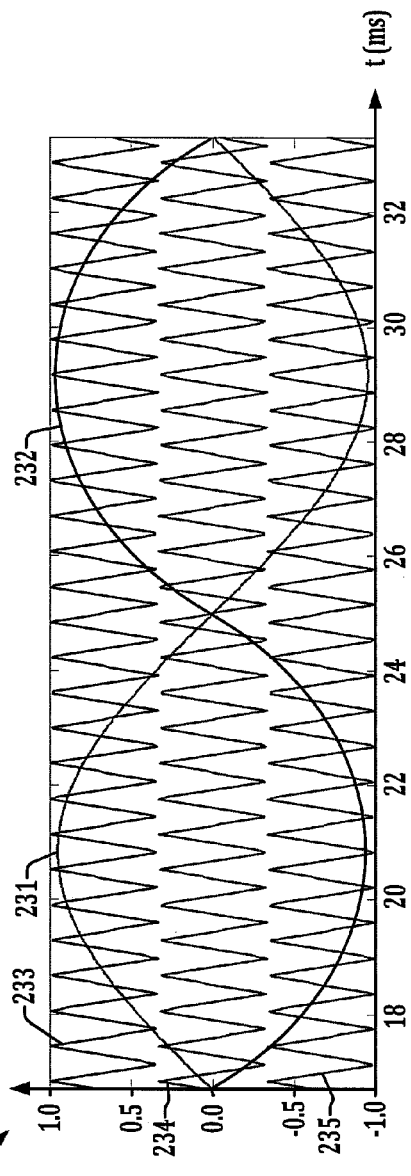
FIG. 6 is a graph illustrating an exemplary level shifted pulse width modulation implementation in the NNPC power converter controller of FIGS. 1 and 2.

As further shown in the graph 230 of FIG. 6, moreover, the controller 122 is configured to implement sinusoidal pulse width modulation in order to ascertain or otherwise determine a desired voltage level for the voltage at the AC node 116 of the power converter stage 100. As seen in FIG. 6, for instance, an in phase disposition pulse width modulation implementation is shown, in which triangle wave carrier signals or values 233, 234 and 235 are offset from one another, and the controller 122 compares the signals or values 233-235 with one or more modulating signals or reference signals 231 and/or 232. In certain implementations, only a single reference signal 231 need be used, and the reference may be generated according to any suitable input, such as comparison of a desired system operating condition (e.g., setpoint) with one or more feedback signals or values. The controller 122 employs suitable logic or programming to implement switching control signals for the six switching devices S1-S6 of the power converter stage 100. In particular, the controller 122 may implement the sine-triangle modulation using hardware carrier signal generator circuitry and suitable hardware comparators and/or may generate digital values representing the carriers 233-235 and perform the comparisons to the reference signal(s) 231, 232 in firmware/software, using suitable processor circuitry programmed with corresponding programming instructions. Following determination of the desired AC node level for the converter stage 100, the controller 122 determines whether the desired AC node voltage level involves redundant switching states, and if so, performs selection or choice from among the redundant states to implement the desired AC node voltage as well as one or more control objectives, such as the illustrated and described capacitor voltage regulation goal, common mode reduction, power factor correction (for rectifier implementations), etc. In this regard, the controller 122 can implement the vector selection concepts of the present disclosure in processor-executed firmware/software and/or using logic circuitry, or combinations thereof, etc.

In this regard, the inventors have further appreciated that the system common mode voltage Vcm in an AC-DC-AC power converter constructed using back-to-back NNPC or other back-to-back multilevel converter configurations is the sum of the common mode voltage contribution Vcmr of the rectifier 70 and the common mode voltage contribution Vcmi of the inverter 80. In the illustrated configuration having a neutral node "N", and input ground node "g", and an output zero voltage or neutral node "0", where the rectifier contribution Vcmr=Vg−Vn, the inverter contribution Vcmi=Vo−Vn, and the overall or total contribution in the power conversion system 2 is given by Vcm=Vog=Vcmi−Vcmr. Furthermore, certain aspects of the present disclosure advantageously provide for operation of the back-to-back multiphase multilevel conversion system 2 by provision of the rectifier and inverter switching control signals 124 by the controller 122 so as to facilitate common mode voltage control over the common mode contributions of the rectifier 70 and the inverter 80. In some cases, the switching control signals 124*a* provided to the rectifier stages 100*a*-100*c* and the inverter switching control signals 124*b* provided to the multilevel inverter stages 100*r*-100*t* provide for complete or at least partial cancellation, with the inverter common mode contribution completely or at least partially offsetting or canceling the common mode voltage contribution associated with the rectifier 70 through redundant vector selection by the controller 122. Thus, the selection of redundant switching states in the table 126 by the controller 122 can be selectively employed to facilitate common mode voltage reduction in addition to the capacitor voltage regulation control objective.

Moreover, the controller 122 provides the switching control signals 124 in certain embodiments so as to control charging and discharging of the switched capacitors C1 and C2 in order to regulate the corresponding capacitor voltages $V_{C1}$ and $V_{C2}$ of the individual stages 100 to a target fraction of the DC voltage $V_{DC}$ of the DC bus circuit 90. The control of the capacitor voltages $V_{C1}$ and $V_{C2}$, moreover, facilitates substantially equal distribution of the voltages seen at the individual switching devices S1-S6 of a given stage 100. The table 126 and FIG. 2 shows six possible switching vectors V1, V2, V3, V4, V5 and V6 corresponding to different switching states of the NNPC switching devices S1-S6, along with corresponding line-to-neutral AC node voltage values relative to the input DC level $V_{DC}$, where a "1" indicates the corresponding switch S is 'on' or conductive. In addition, the table 126 shows corresponding distinct voltage levels "L" at the AC terminal of the corresponding stage 100, in this case, providing four distinct voltage levels L0-L3 relative to the neutral N. As discussed above, sinusoidal pulse width modulation techniques are employed by the controller 122 to initially determine the desired level (L0, L1, L2 or L3) for the converter 100 during a given pulse width modulation control cycle. Then, if redundant switching states or vectors are available for the desired AC node voltage level (e.g., L1 or L2 in the illustrated four-level converter scenario), the controller 122 employs logic and/or suitable processor-implemented algorithms in order to preferentially select one of the redundant switching states for generation of the corresponding pulse width modulation control signals 124 to control the converter stage 100.

The switching vector V1 in the four-level example of FIG. 2 corresponds to a first level "3", redundant switching vectors V2 and V3 provide a second voltage level "2", the switching vectors V4 and V5 both provide a third level "1", and the sixth switching vector V6 provides a fourth level "0". Specifically, the first vector V1 provides an AC node voltage level of $+V_{DC}/2$, the second and third switching vectors V2 and V3 (L2) are redundant with one another relative to the line-to-neutral AC node voltage, each yielding a value of $+V_{DC}/6$. Vectors V4 and V5 (L1) are also a redundant switching state pair, each providing an AC node voltage value of $-V_{DC}/6$, and the final switching state or vector V6 yields a voltage of $-V_{DC}/2$ at the AC node 116 of the converter 100. As seen in FIG. 2, moreover, the charging and discharging of the capacitors C1 and C2 is controlled through redundant vector selection, where the effect on the corresponding capacitor voltages may be different for the redundant switching states allowing intelligent vector selection to control the capacitor charging and/or discharging. For example, if the desired AC node voltage level is to be $V_{DC}/6$, vector V2 can be selected to charge C1 if the output current $I_{OUT}$ is positive (>0), or to discharge C1 if the output current is negative: Alternatively selection of the redundant vector V3 discharges C1 and C2 for positive output current, and charges these capacitors C1 and C2 if the output current is negative. As seen in the table 126 of FIG. 2, moreover, similar charging and/or discharging choices can be made by selection in the controller 122 from among redundant vectors V4 and V5 where the desired output voltage level is $-V_{DC}/6$ (level L1).

Figure 7:
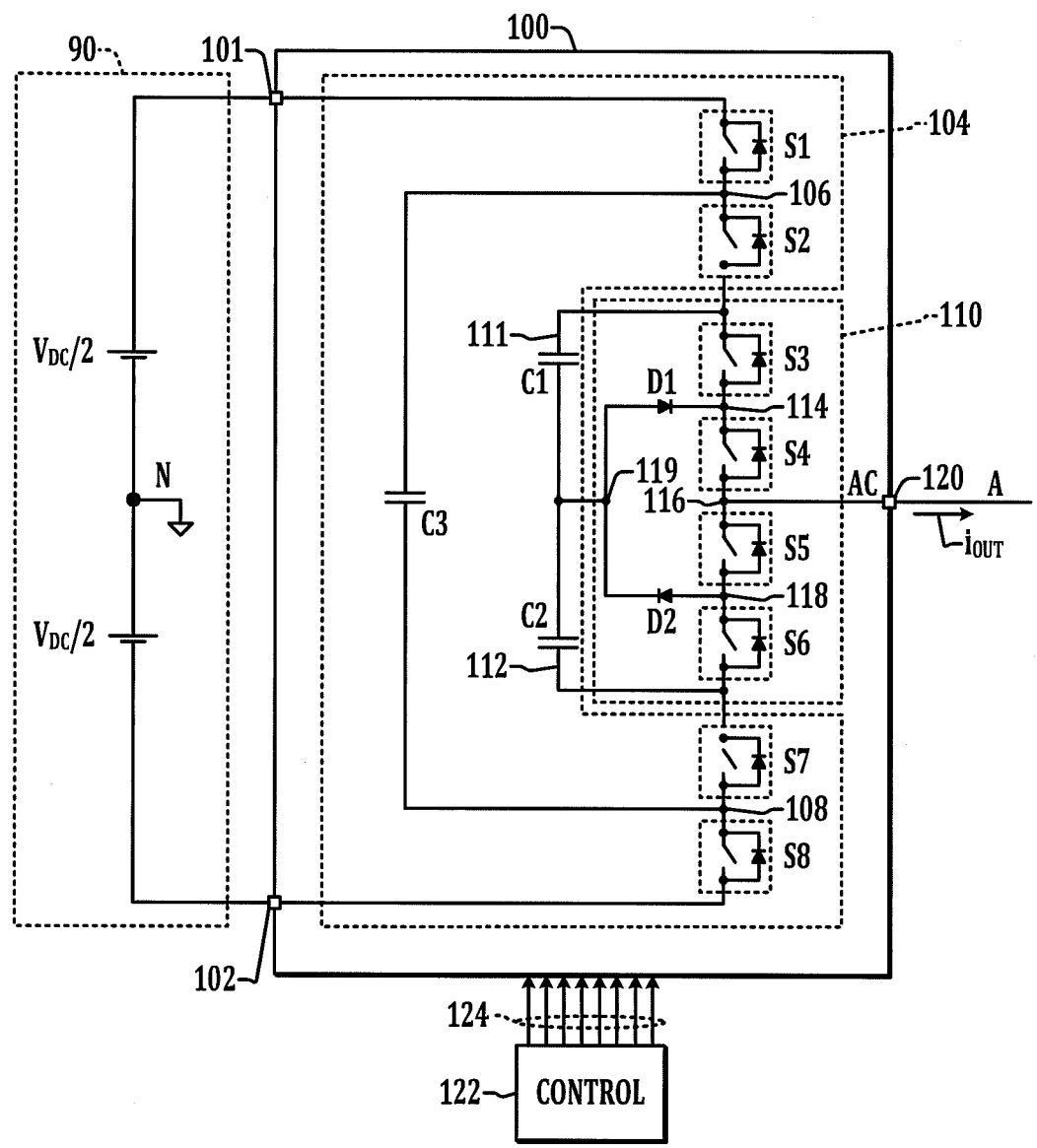
FIG. 7 is a schematic diagram illustrating another NNPC power converter with multiple switched capacitor nesting stages providing a five level output in accordance with further aspects of the present disclosure.

FIG. 7 shows another NNPC power converter 100, in this case including multiple switched capacitor nesting stages configured around an NPC core circuit 110, and providing a five-level output. This nested power converter 100 includes an inverter circuit 110, a switched capacitor circuit 104 and a controller 122. As in the above-described NNPC cell 100 of FIG. 1, the inverter circuit 110 in the converter 100 of FIG. 7 includes switching devices S3-S6 connected in series with one another between inverter circuit input nodes 111 and 112, along with an inverter output node 116 connecting S4 and S5. In addition, the inverter circuit 110 includes clamping switches or other clamping elements D1 and D2 connected in series with one another between first and second internal nodes 114 and 118 around switches S4 and S5 as shown. The clamping circuit also includes a third internal node 119 joining clamping elements D1 and D2. The clamping devices in the drawing are shown as diodes. However active switches such as IGBTs and IGCTs can also be used for clamping purposes.

The converter 100 of FIG. 7 also includes a double nested switched capacitor circuit 104, with a first switch S1 connected between the first DC input 101 and a fourth internal node 106, and a second switch S2 connected between node 106 and the first inverter input node 111. In addition, a third switch S7 is connected between the second inverter circuit input node 112 and a fifth internal node 108, and a fourth switch S8 is connected between the fifth internal node 108 and the second DC input 102. Two levels of series-connected switched capacitors C1/C2 and C3 are provided in FIG. 7, with C1 connected between the nodes 111 and 119 and C2 connected between nodes 119 and 112, as well as C3 connected between nodes 106 and 108. The controller 122 provides switching control signals 124 to operate the inverter switches S3-S6 and the capacitor switching devices S1, S2, S7 and S8 to provide a multilevel output voltage at the inverter output node 116 as well as to control charging and discharging of the capacitors C1-C3, for example; using selection of redundant switching vectors as described above.

FIG. 8 illustrates a table 240 showing switching states for the eight switches S1-S8 and corresponding switching control signals 124-1 through 124-8 of the five level converter 100 of FIG. 7 along with the corresponding impacts on the capacitor voltages (not applicable or "N/A", charging or discharging dependent upon the polarity of the output current $I_{OUT}$). As with the above illustrated four-level example (e.g., table 126 in FIG. 2 above), the controller 122 employs the switched capacitor voltage impact characteristics of each of the redundant switching states for AC node voltage levels having redundant states, together with one or more measured values such as the polarity of the AC node current, the switched capacitor voltage levels, etc., in selecting from the available redundant states. As seen in the table 240 of FIG. 8, similar to that of the table 126 and FIG. 2, there are several AC node voltage levels (e.g., the midrange levels 1-3 in this five-level example) for which there are multiple redundant states. Specifically, level L3 includes possible switching vectors V2-V4, each having different potential impacts on the voltages across the capacitors C1, C2 and C3. Similarly, three redundant states V9-V11 are available for selection by the controller 122 in order to implement AC node voltage level L1 in FIG. 8. The mid-level L2, moreover, has four available redundant switching states or vectors V5-V8 as shown.

Although four-level and five-level implementations are illustrated and described, it will be appreciated that the various sinusoidal pulse width modulation techniques of the present disclosure can be employed in connection with operation of multilevel converters operable to provide any number N of discrete AC node voltage levels, where N≥4. Moreover, although the illustrated examples are NNPC type multilevel converters 100, the various concepts of the present disclosure can be used in association with any suitable form of multilevel converter capable of providing more than three discrete voltage levels at an AC node.

Figure 9:
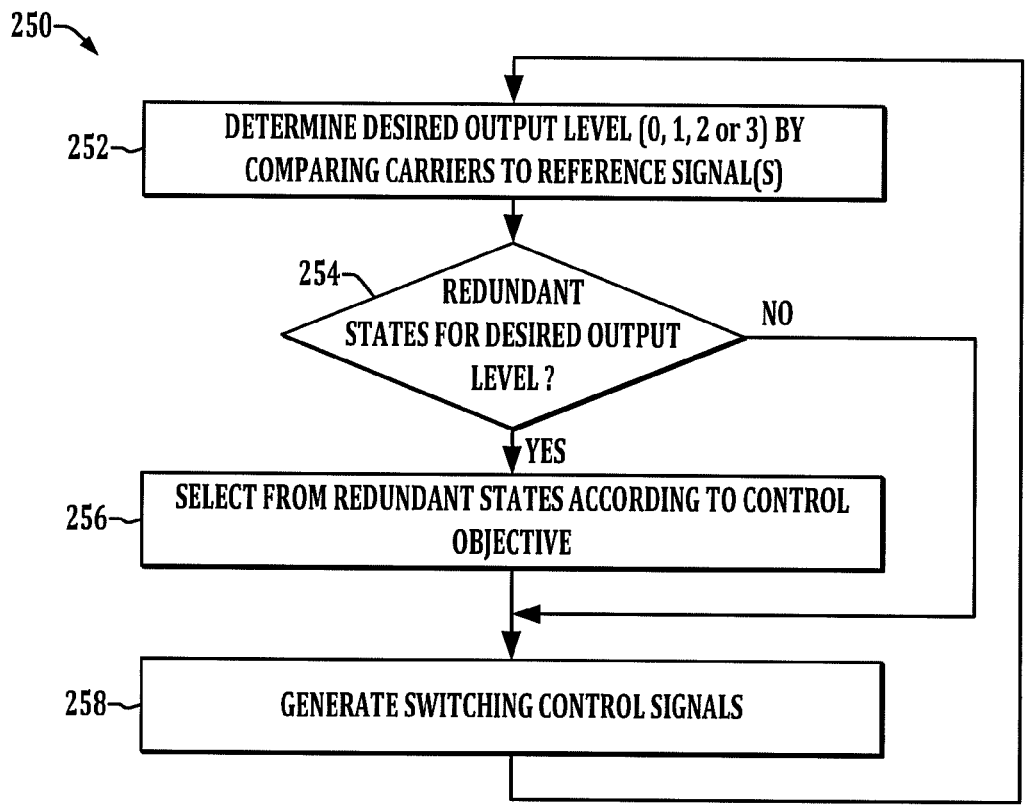
FIG. 9 is a flow diagram illustrating an exemplary method for operating a multilevel converter using sinusoidal pulse width modulation in accordance with one or more aspects of the present disclosure.
Figure 10:
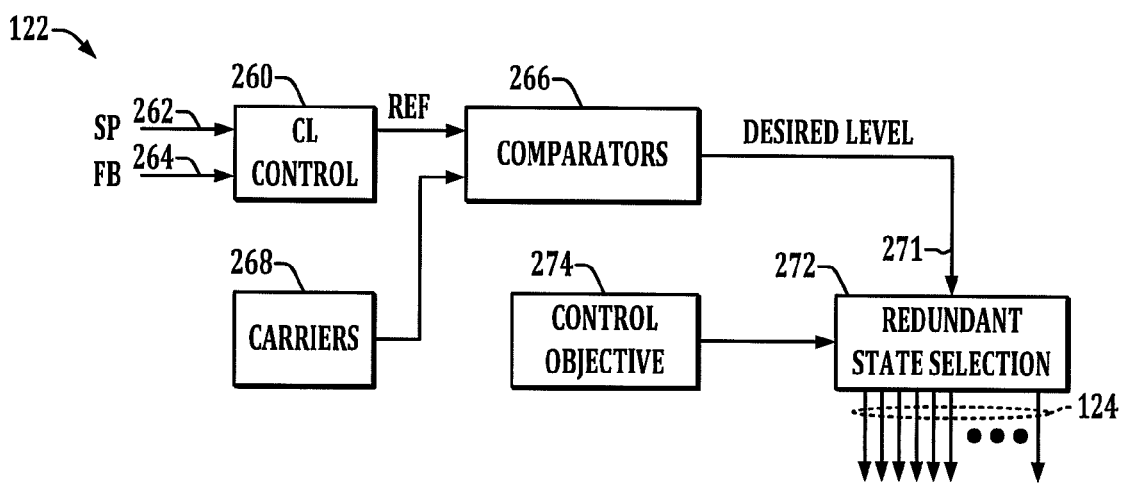
FIG. 10 is a schematic diagram illustrating an exemplary circuit implementation of a controller providing switching control signals with selective redundant vector selection to implement a control objective for operating a multilevel converter in accordance with various aspects of the disclosure.

Referring now to FIGS. 9 and 10, FIG. 9 illustrates an exemplary process or method 250 for operating a multilevel converter operative according to a plurality of switching control signals 124 to provide a plurality of distinct voltage levels L0-L3 at an AC node 116, such as the converters 100 illustrated and described above. In addition, FIG. 10 schematically illustrates implementation of the method 250 in the controller 122. The exemplary controller 122 may include at least one programmed processor and/or suitable logic to perform the process 250, and suitable embodiments may be implemented using hardware, processor-executed software, processor-executed firmware, programmable logic, or combinations thereof, etc., with program instructions being stored in a memory associated with the controller 122 as needed. In this regard, the exemplary method 250 of FIG. 9 and other methods of the present disclosure may be implemented using computer executable instructions from a non-transitory computer readable medium, such as a computer memory, a memory within a power converter control system (e.g., controller 14), a CD-ROM, floppy disk, flash drive, database, server, computer, etc. which has computer executable instructions for performing the processes and controller functionality described herein. While the exemplary method 250 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure.

The method 250 of FIG. 9 begins at 252 with the controller 122 determining a desired AC node voltage level (desired level 271 in FIG. 10) by comparing a plurality of carrier signals or values (e.g., carriers 233, 234 and 235 in FIG. 6) to at least one reference signal or value (231, 232 in FIG. 6 above). As previously noted, the controller 122 may perform the comparison of various signals using hardware circuitry and/or this may be done via a programmed processor for generation and use of carrier values and reference values which can be compared by a programmed processor. At 254, the controller 122 determines whether there are redundant states for the desired AC node level. For example, if the currently desired AC node level is L1 or L2 for the four-level example exemplified by the table 126 in FIG. 2 above, the controller 122 has two different redundant states or vectors from which to choose in order to achieve the desired AC node voltage level, with the selection from among the redundant states allowing selective facilitation of one or more control objectives (e.g.; control objective 274 in FIG. 10).

If redundant states are available for the current desired AC node level (YES at 254), the process 250 continues at 256 where the controller chooses or selects from a plurality of redundant switching states corresponding to the desired AC node voltage level 271 at least partially according to a control objective 274. As seen in FIG. 9, moreover, where there are no redundant states from which to choose for the desired AC node level (NO at 254), the process 250 does not include redundant state selection, whereby the selection from among redundant states by the controller 122 is selective in the method 250. In this case, or after the controller 122 has selected from among available redundant states at 256, the method 250 proceeds to 258 at which the controller 122 provides the switching control signals 124 to the converter circuit to operate the multilevel converter 100. For instance, in the example of FIG. 2 above, the controller 122 implements the switching control signals 124-1 through 124-6 according to the selected switching state or vector V1-V6 as detailed above. In this regard, the controller 122 may include any suitable signal conditioning or driver circuitry (not shown) in order to actuate the corresponding switching devices S1-S6 of the multilevel converter 100.

In certain embodiments of the method 250, the controller 122 receives one or more feedback signals or values (FB 264 in FIG. 10), such as the switched capacitor voltages, the polarity of the current flowing into or out of the AC node 116, etc. In certain embodiments, moreover, where the control objective 274 relates to regulating switched capacitor voltages, the selection at 256 from the plurality of redundant switching states is done to facilitate regulation of the voltages of the switched capacitors C1, C2 at least partially according to the desired AC node voltage level 271, the present voltage conditions of the switched capacitors C1, C2, and the polarity of a current flowing into or out of the AC node 116. In addition, where the converter 100 is an inverter (e.g., inverter 80 in FIG. 3 above), the controller provides the switching control signals 124 at 258 to the converter circuit to cause the converter 100 to convert DC input power received via the DC nodes 101, 102 to provide AC output power at the AC node 116 at least partially according to the desired AC node voltage level 271 and the control objective 274. Moreover, where the converter 100 is used as a rectifier 70, the controller 122 provides the switching control signals 124 at 258 so as to cause the multilevel converter 100 to convert AC input power received via the AC node 116 to provide DC output power at the DC nodes 101, 102 and to cause the multilevel converter 100 control the AC node voltage at least partially according to the desired AC node voltage level 271 and the control objective(s) 274.

FIG. 10 further illustrates a detailed implementation of the logic and/or programming of the controller 122 in order to implement the process 250 of FIG. 9. As seen in FIG. 10, the exemplary controller 122 includes a closed loop control component or circuit 260 receiving at least one setpoint (SP) signal or value 262 as well as one or more feedback signals or values (FB) 264, where the closed loop control component 262 provides at least one reference output (REF) to a component or circuit implementing one or more comparators 266 for comparison of the reference signal(s) or value(s) output from the closed loop control component 216 with a plurality of carriers 268 (e.g., carrier signals or values 233-235 in FIG. 6 above). The comparators 266 provide one or more outputs indicating a desired AC node level 271 for the converter stage 100, such as an integer level number (e.g., 0, 1, 2 or 3 in the four-level example above). The desired level 271 is provided to a redundant state selection component 272 (e.g., firmware/software programmed logic, and/or hardware logic, etc.) which selectively performs selection from among any available redundant switching states or vectors according to at least one control objective 274.

As seen in FIGS. 9 and 10 above, the process 250 and the implementation in the controller 122 are very simple and easy to implement in hardware and/or firmware/software compared to the large amount of calculations and complexity associated with space vector modulation techniques. In addition, the amount of calculation or processing by the controller 122 using sinusoidal pulse width modulation is independent of the modulation index, which is not the case for SVM techniques. Moreover, the approach of FIGS. 9 and 10 is easily adaptable to higher order multilevel converters 100 (e.g., the five-level example of FIGS. 7 and 8 above).

Figure 11A:
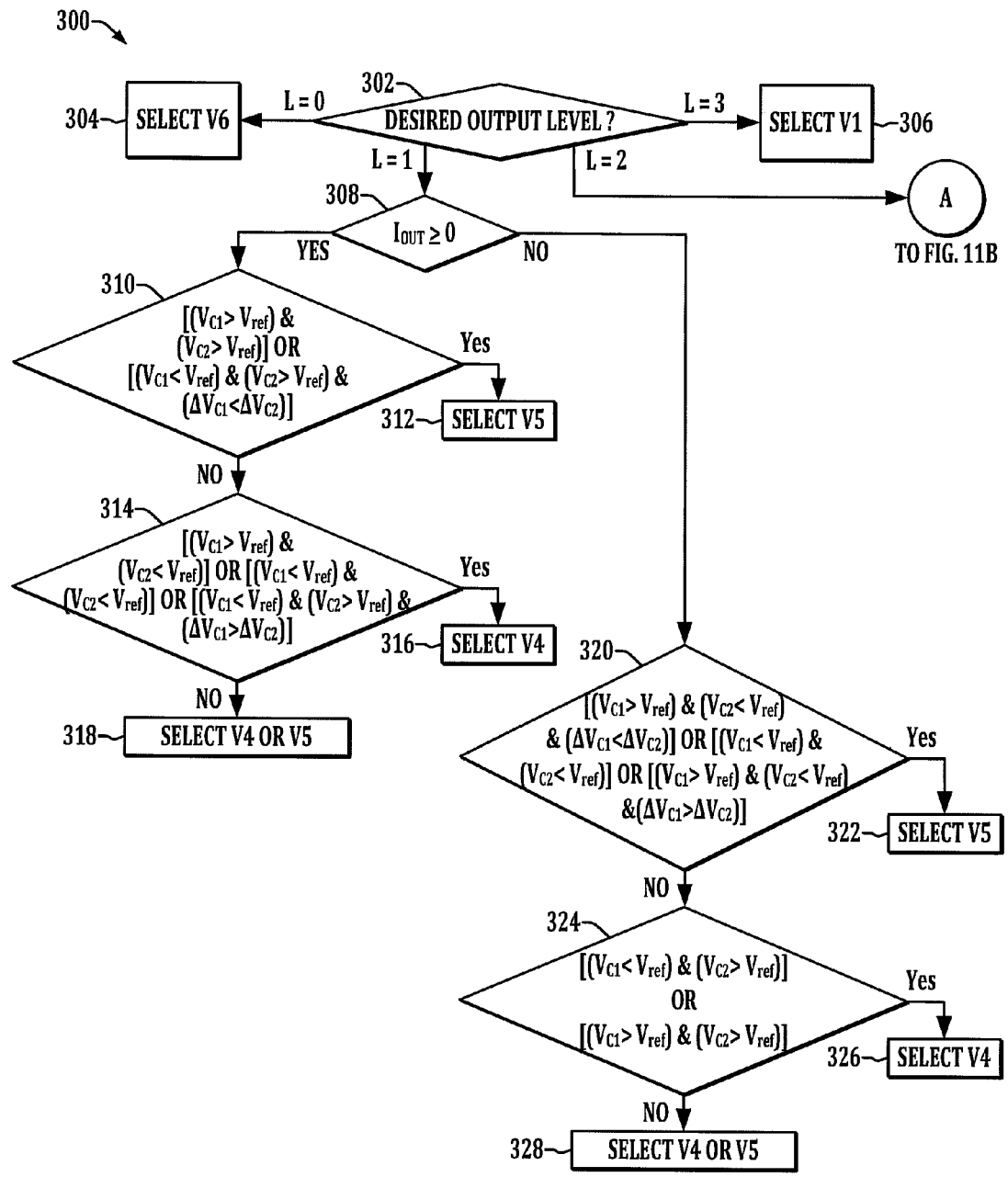
FIGS. 11A and 11B provide a flow chart illustrating a detailed process for controlling a four level NNPC converter to facilitate switched capacitor voltage level regulation.
Figure 11B:
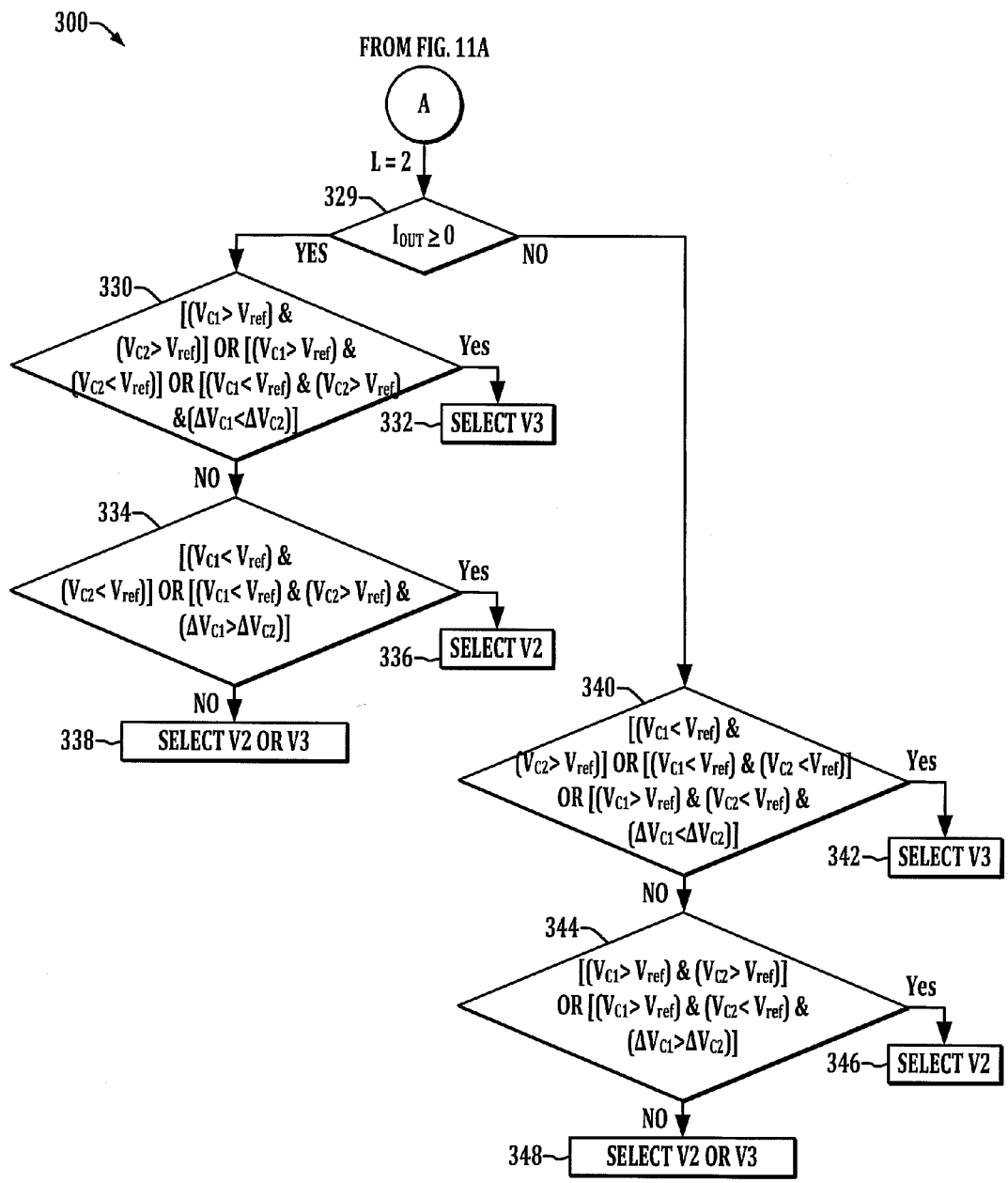

FIGS. 11A and 11B illustrate a detailed process 300 for operating the illustrated four-level converter 100 in accordance with various aspects of the present disclosure, with the control objective 274 relating to balancing or regulating the voltages $V_{C1}$ and $V_{C2}$ of the converter 100 to a predetermined reference value $V_{ref}$, such as $V_{DC}/3$ in one possible implementation. A determination is made at 302 in FIG. 11A as to the desired AC node level (e.g., levels L0-L3 in table 126 of FIG. 3 above). If the desired AC node voltage level is "0", the controller 122 selects vector V6 at 304 and uses this to generate the switching control signals 124 (no redundant vectors or switching states for L0 according to the table 126). Similarly, if the desired AC node level is "3", the controller 122 selects vector V1 at 306 per table 126 in FIG. 2. If the desired AC node voltage level is "2", the process 300 continues in FIG. 11B as further discussed below.

Otherwise, if the desired AC node voltage level is "1", the controller 122 makes a determination at 308 (e.g., according to one or more feedback signals or values 264 in FIG. 10) as to whether the AC node current polarity is positive or negative. For positive current flow (YES at 308 in FIG. 11A), the controller checks the conditions 310, and if true (YES at 310), selects vector V5 at 312. In this regard, the conditions 310 $((V_{C1}>V_{ref})$ and $(V_{C2}>V_{ref}))$ OR $((V_{C1}<V_{ref})$ and $(V_{C2}>V_{ref})$ and $(\Delta V_{C1}<\Delta V_{C2}))$ represent conditions in which both the capacitor voltages $V_{C1}$ and $V_{C2}$ exceed the desired reference level $V_{ref}$ or the voltage $V_{C1}$ across C1 is low and the voltage $V_{C2}$ across C2 is high and the voltage difference $\Delta V_{C2}$ associated with capacitor C2 (representing the absolute value of the difference between $V_{C2}$ and $V_{ref}$) is greater than that of C1. In the illustrated embodiment, under these conditions, the controller 122 selects vector V5 at 310, 312 as this will have no impact on the voltage $V_{C1}$, but will charge C2 thus increasing the voltage across C2 for positive AC node current flow as shown in the table 126 in FIG. 2.

Otherwise (NO at 310), the controller 122 verifies the present situation against the conditions set forth at 314 in FIG. 11A, and if true (YES at 314), selects vector V4 at 316. Otherwise (NO at 314), the controller 122 selects either V4 or V5, with the controller 122 optionally selecting among V4 and V5 at 318 in order to facilitate an additional control objective 274 (e.g., common mode voltage reduction or control, power factor correction, DC bus voltage regulation, switching noise reduction, THD reduction, etc.). For the desired AC node level L1, where the AC node current is negative (NO at 308 in FIG. 11A), the controller checks the conditions at 322. If true (YES at 320), the controller 122 selects vector V5 at 322, and otherwise (NO at 320) checks the conditions at 324, and if true (YES at 324), the controller 122 selects vector V4 at 326. Otherwise (NO at 324), the controller 122 selects either vector V4 or V5 at 328, for example, in order to facilitate an additional control objective 274.

Referring also to FIG. 11B, if the desired AC node voltage level is "2", the controller determines whether the AC node current is positive or negative at 329. For positive AC node current (YES at 329), the controller 122 checks the conditions at 330, and if true (YES at 330), selects vector V3 at 332. Otherwise (NO at 330), the controller 122 verifies the conditions at 334 in FIG. 11B. If these are true (YES at 334), vector V2 is selected at 336, and otherwise (NO at 334) the controller 122 selects either V2 or V3 at 338 for operating the converter stage 100 in the current PWM control cycle. For the AC node level of "2" with negative AC node current flow (NO at 329 in FIG. 11B), the controller 122 checks the conditions at 340, and if true (YES at 340), selects vector V3 at 342. Otherwise (NO at 340), the controller 122 checks the conditions at 344 and if true (YES at 344), selects vector V2 at 346. If these conditions are not met (NO at 344), the controller 122 selects either V2 or V3 at 348, for example, according to a different control objective 274. Other implementations are possible for four-level converters 100, for example, using different conditional checks in deciding how to implement the charging/discharging of the capacitors C1 and C2 for a capacitor voltage regulation control objective 274. In addition, various other embodiments are possible using suitable logic, whether implemented in hardware and/or firmware/software programming of processing components in the controller 122, in order to implement or facilitate one or more control objectives 274, including without limitation those mentioned above. Moreover, similar processing can be undertaken for controllers of any suitable number of levels "N" (e.g., the five-level converter 100 of FIGS. 7 and 8 above).

Figure 12:
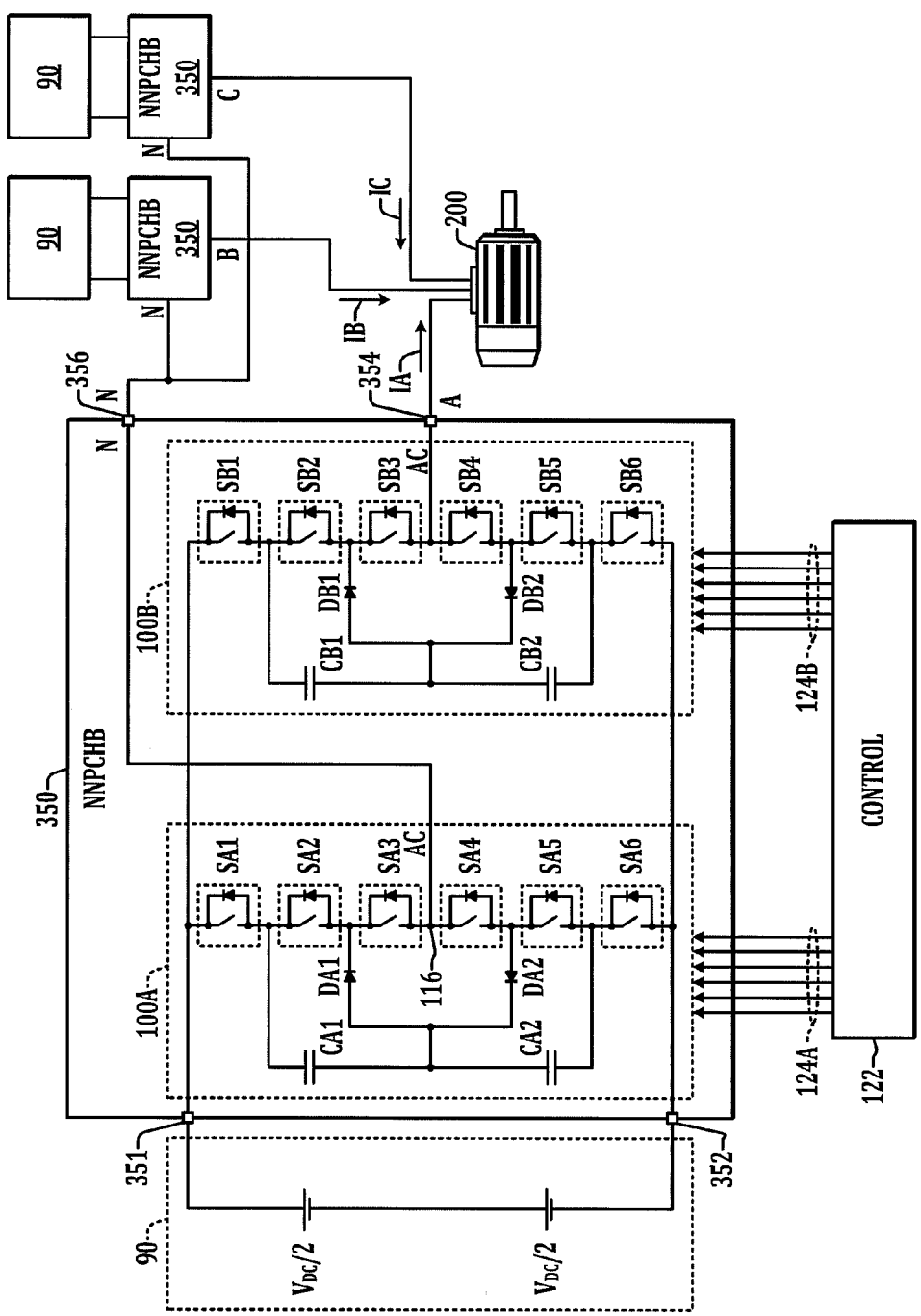
FIG. 12 is a schematic diagram illustrating an NNPC H-bridge (NNPCHB) power conversion system including two NNPC power converter stages with an inverter output of the first stage providing a system neutral and the inverter output of the second stage providing a line voltage output to drive a motor load.

Referring also to FIG. 12, the controller 122 can implement the same or similar control processes 250, 350 for individual converter stages 100 in systems employing multiple converters 100. A power converter 350 is illustrated in FIG. 12, including two NNPC stages 100A and 100B as described above in connection with FIGS. 1 and 2, connected in an H-bridge configuration to implement an inverter, referred to herein as an NNPC H-bridge (NNPCHB). The NNPCHB converter 350 includes DC input terminals 351 and 352 receiving input DC voltage from a source 90 as described above, with the input terminals 351 and 352 being connected to the DC inputs of both of the NNPC stages 100A and 100B as shown. Similar to the NNPC converter stage 100 of FIG. 1, the first stage 100A in FIG. 12 includes switching devices SA1, SA2, SA3, SA4, SA5 and SA6, as well as clamping switches or other clamping elements DA1 and DA2 and capacitors CA1 and CA2 having corresponding voltages $V_{CA1}$ and $V_{CA2}$ (e.g., $V_{DC}/3$). Likewise, the second stage 100B includes switches SB1, SB2, SB3, SB4, SB5 and SB6, as well as clamping elements DB1 and DB2 and capacitors CB1 and CB2 with corresponding capacitor voltages $V_{CB1}$ and $V_{CB2}$ (e.g., $V_{DC}/3$). The switching devices DA1, DA2, DB1 and DB2 are shown as diodes in the drawing, but active switches such as IGBTs and IGCTs can also be used for clamping elements. The AC node 116 of the converter 100A in FIG. 12 is connected to a system neutral node 356, and the AC node 116 of the second multilevel power converter 100B provides an AC output 354 for the power conversion system 350.

The controller 122 in this case provides switching control signals 124A to the first NNPC converter 100A as well as a set of switching control signals 124B to the second NNPC stage 100B. The main feature of the proposed SPWM technique is that it can be applied to each leg separately to control the flying capacitor of that leg and at the same time generate output waveforms. In each phase, just the modulating signals have 180 degrees phase shift with respect to each other. Also for different phases the modulating signals have ±120 degrees phase shift with respect to each other.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
a multilevel converter including first and second DC nodes, an AC node, and a converter circuit including switching devices and a plurality of switched capacitors, the converter circuit operative according to a plurality of switching control signals to provide a plurality of distinct voltage levels at the AC node, the multilevel converter comprising:
a first circuit, including a first switching circuit with at least four switching devices connected in series with one another between first and second input nodes, with the AC node connecting two of the plurality of switching devices, and a clamping circuit including first and second clamping elements connected in series with one another between first and second internal nodes of the first switching circuit, and a third internal node joining the first and second clamping elements, and
a switched capacitor circuit, including a plurality of capacitor switching devices individually connected between a corresponding DC node and a corresponding input node of the first switching circuit,
the plurality of capacitors being individually connected between a corresponding input node of the first switching circuit and the third internal node; and
a controller providing the switching control signals to the multilevel converter, the controller configured to compare a plurality of carrier signals or values to at least one reference signal or value to determine a desired AC node voltage level for operation of the multilevel converter, and to select from a plurality of redundant switching states for at least one of the distinct voltage levels at the AC node at least partially according to a control objective;
wherein the controller provides the plurality of switching control signals to the plurality of switching devices of the first switching circuit and to the capacitor switching devices to provide the multilevel voltage at the AC node, the controller configured to select from among a plurality of redundant switching states for at least one of the distinct voltage levels at the AC node at least partially according to the desired AC node voltage level and the control objective.

2. The power conversion system of claim 1, wherein the control objective is related to regulating switched capacitor voltages, and wherein the controller is configured to select from the plurality of redundant switching states for the at least one distinct voltage level to facilitate regulation of the voltages of the switched capacitors at least partially according to:
the desired AC node voltage level,
present voltage conditions of the switched capacitors, and
a polarity of a current flowing into or out of the AC node.

3. The power conversion system of claim 2, wherein the controller is configured to select from the plurality of redundant switching states at least partially to regulate the voltages of the switched capacitors to at least one reference level.

4. The power conversion system of claim 1, wherein the plurality of capacitors are individually directly connected to the third internal node.

5. The power conversion system of claim 1, wherein the multilevel converter is configured to selectively provide one of an integer number N voltage levels at the AC node, where N≥4, according to the switching control signals provided by the controller.

6. The power conversion system of claim 1, wherein the multilevel converter is an inverter, and wherein the controller is configured to provide the plurality of switching control signals to cause the multilevel converter to convert DC input power received via the DC nodes to provide AC output power at the AC node at least partially according to the desired AC node voltage level and the control objective.

7. The power conversion system of claim 1, wherein the multilevel converter is a rectifier, and wherein the controller is configured to provide the plurality of switching control signals to cause the multilevel converter to convert AC input power received via the AC node to provide DC output power at the DC nodes.

8. The power conversion system of claim 1, comprising a plurality of multilevel converters forming a multiphase conversion system with a plurality of AC nodes, and wherein the controller is configured to provide the switching control signals to the plurality of multilevel converters according to the plurality of redundant switching states for the at least one distinct voltage level at the corresponding AC nodes at least partially according to a desired AC node voltage level and the control objective.

9. The power conversion system of claim 1, wherein the multilevel converter is configured to selectively provide one of an integer number N voltage levels at the AC node, where N≥4, according to the switching control signals provided by the controller.

10. The power conversion system of claim 1:
wherein the multilevel converter is a nested neutral point clamped H-bridge converter comprising first and second nested neutral point clamped (NNPC) converter stages, the individual NNPC converter stages comprising:
a first circuit, including a first switching circuit including a plurality of switching devices connected in series with one another between first and second input nodes, with the AC node connecting two of the plurality of switching devices, and a clamping circuit including first and second clamping elements connected in series with one another between first and second internal nodes of the first switching circuit, and a third internal node joining the first and second clamping elements, and
a switched capacitor circuit, including a second switching circuit including a plurality of capacitor switching devices individually connected between a corresponding DC node and a corresponding input node of the first switching circuit, and the plurality of capacitors individually connected between a corresponding input node of the first switching circuit and the third internal node; and
wherein the controller is configured to provide the switching control signals to the plurality of multilevel converters according to the plurality of redundant switching states for the at least one distinct voltage level at the corresponding AC nodes at least partially according to a desired AC node voltage level and the control objective.

11. A power conversion system, comprising:
a multilevel converter including first and second DC nodes, an AC node, and a converter circuit including switching devices and a plurality of switched capacitors, the converter circuit operative according to a plurality of switching control signals to provide a plurality of distinct voltage levels at the AC node; and
a controller providing the switching control signals to the multilevel converter, the controller configured to compare a plurality of carrier signals or values to at least one reference final or value to determine a desired AC node voltage level for operation of the multilevel converter, and to select from a plurality of redundant switching states for at least one of the distinct voltage levels at the AC node at least partially according to a control objective;
wherein the multilevel converter is a back-to-back converter comprising:
at least one multilevel rectifier stage,
at least one multilevel inverter stage, and
an intermediate DC circuit connected between the multilevel rectifier stage and the multilevel inverter stage;
wherein the multilevel rectifier stage and the multilevel inverter stage each include first and second DC nodes, an AC node, and a converter circuit including switching devices and a plurality of switched capacitors, the converter circuit operative according to a plurality of switching control signals from the controller to provide a plurality of distinct voltage levels at the AC node;
wherein the controller is configured to provide the plurality of switching control signals to cause the multilevel rectifier stage to convert AC input power received via the AC node to provide DC output power at the DC nodes and to cause the multilevel converter control a voltage level at the AC node at least partially according to a desired AC node voltage level for the rectifier stage and the control objective; and
wherein the controller is configured to provide the plurality of switching control signals to cause the multilevel inverter stage to convert DC input power received via the DC nodes to provide AC output power at the AC node at least partially according to a desired AC node voltage level for the inverter stage and the control objective.

12. The power conversion system of claim 1, wherein the control objective is related to common mode rejection and wherein the controller is configured to provide the plurality of switching control signals to at least partially facilitate reduced common mode voltages in the power conversion system.

13. The power conversion system of claim 1, wherein the multilevel converter is a rectifier, and wherein the control objective is related to power factor correction.

14. The power conversion system of claim 1, wherein the multilevel converter is a rectifier, and wherein the control objective is related to regulating a DC voltage across the first and second DC nodes.

15. A power conversion system, comprising:
a multilevel converter including first and second DC nodes, an AC node, and a converter circuit including switching devices and a plurality of switched capacitors, the converter circuit operative according to a plurality of switching control signals to provide a plurality of distinct voltage levels at the AC node, the multilevel converter comprising:

a first circuit, including a first switching circuit with a plurality of switching devices connected in series with one another between first and second input nodes, with the AC node connecting two of the plurality of switching devices, and a clamping circuit including first and second clamping elements connected in series with one another between first and second internal nodes of the first switching circuit, and a third internal node joining the first and second clamping elements, and a switched capacitor circuit, including a plurality of capacitor switching devices individually connected between a corresponding DC node and a corresponding input node of the first switching circuit, the plurality of capacitors being individually connected between a corresponding input node of the first switching circuit and the third internal node, the plurality of capacitors being individually directly connected to the third internal node; and a controller providing the switching control signals to the multilevel converter, the controller configured to compare a plurality of carrier signals or values to at least one reference signal or value to determine a desired AC node voltage level for operation of the multilevel converter, and to select from a plurality of redundant switching states for at least one of the distinct voltage levels at the AC node at least partially according to a control objective;

wherein the controller provides the plurality of switching control signals to the plurality of switching devices of the first switching circuit and to the capacitor switching devices to provide the multilevel voltage at the AC node, the controller configured to select from among a plurality of redundant switching states for at least one of the distinct voltage levels at the AC node at least partially according to the desired AC node voltage level and the control objective.

16. The power conversion system of claim 1, wherein the control objective is related to regulating switched capacitor voltages, and wherein the controller is configured to select from the plurality of redundant switching states for the at least one distinct voltage level to facilitate regulation of the voltages of the switched capacitors at least partially according to:
the desired AC node voltage level,
present voltage conditions of the switched capacitors, and
a polarity of a current flowing into or out of the AC node.

17. The power conversion system of claim 16, wherein the controller is configured to select from the plurality of redundant switching states at least partially to regulate the voltages of the switched capacitors to at least one reference level.

18. The power conversion system of claim 15, wherein the multilevel converter is configured to selectively provide one of an integer number N voltage levels at the AC node, where N≥4, according to the switching control signals provided by the controller.

19. The power conversion system of claim 15, comprising a plurality of multilevel converters forming a multiphase conversion system with a plurality of AC nodes, and wherein the controller is configured to provide the switching control signals to the plurality of multilevel converters according to the plurality of redundant switching states for the at least one distinct voltage level at the corresponding AC nodes at least partially according to a desired AC node voltage level and the control objective.

20. The power conversion system of claim 15, wherein the control objective is related to common mode rejection and wherein the controller is configured to provide the plurality of switching control signals to at least partially facilitate reduced common mode voltages in the power conversion system.

* * * * *